(12) United States Patent
Park et al.

(10) Patent No.: US 12,525,297 B2
(45) Date of Patent: Jan. 13, 2026

(54) NONVOLATILE MEMORY DEVICE AND MEMORY PACKAGE INCLUDING THE SAME

(71) Applicant: Samsung Electronics Co., Ltd., Suwon-si (KR)

(72) Inventors: Hyunkook Park, Suwon-si (KR); Ahreum Kim, Suwon-si (KR); Pansuk Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 18/131,224

(22) Filed: Apr. 5, 2023

(65) Prior Publication Data
US 2024/0062819 A1 Feb. 22, 2024

(30) Foreign Application Priority Data
Aug. 19, 2022 (KR) .......... 10-2022-0103915

(51) Int. Cl.
*G11C 16/08* (2006.01)
*G11C 16/04* (2006.01)
(Continued)

(52) U.S. Cl.
CPC .......... *G11C 16/08* (2013.01); *G11C 16/0483* (2013.01); *H01L 23/481* (2013.01);
(Continued)

(58) Field of Classification Search
CPC ..... G11C 16/08; G11C 16/0483; G11C 5/025; G11C 5/063; G11C 8/08; G11C 8/10; G11C 8/14; H01L 23/481; H01L 23/5283; H01L 24/06; H01L 25/0657; H01L 2224/05147; H01L 2224/0605; H01L 2224/061;
(Continued)

(56) References Cited

U.S. PATENT DOCUMENTS 8,013,383 B2 9/2011 Kidoh et al.
9,070,461 B2 6/2015 Kim
(Continued)

FOREIGN PATENT DOCUMENTS

KR 10-2019-0142715 A 12/2019

*Primary Examiner* — Douglas King
*Assistant Examiner* — Christopher Lane Reece
(74) *Attorney, Agent, or Firm* — Sughrue Mion, PLLC

(57) ABSTRACT

A nonvolatile memory device includes first and second semiconductor layers. The first semiconductor layer includes wordlines extending in a first direction, bitlines extending in a second direction, and a memory cell array connected to the wordlines and the bitlines. The second semiconductor layer is beneath the first semiconductor layer in a third direction, and includes a substrate and an address decoder on the substrate. The address decoder controls the memory cell array, and includes pass transistors connected to the wordlines, and drivers control the pass transistors. In the second semiconductor layer, the drivers are arranged by a first layout pattern along the first and second directions, and the pass transistors are arranged by a second layout pattern along the first and second directions. The first layout pattern is different from the second layout pattern, and the first layout pattern is independent of the second layout pattern.

19 Claims, 29 Drawing Sheets

(51) Int. Cl.
- *H01L 23/00* (2006.01)
- *H01L 23/48* (2006.01)
- *H01L 23/528* (2006.01)
- *H01L 25/065* (2023.01)
- *H10B 41/10* (2023.01)
- *H10B 41/27* (2023.01)
- *H10B 41/35* (2023.01)
- *H10B 41/40* (2023.01)
- *H10B 43/10* (2023.01)
- *H10B 43/27* (2023.01)
- *H10B 43/35* (2023.01)
- *H10B 43/40* (2023.01)
- *H10B 80/00* (2023.01)

(52) U.S. Cl.
CPC .......... *H01L 23/5283* (2013.01); *H01L 24/06* (2013.01); *H01L 25/0657* (2013.01); *H10B 80/00* (2023.02); *H01L 2224/05147* (2013.01); *H01L 2224/0605* (2013.01); *H01L 2224/061* (2013.01); *H01L 2224/065* (2013.01); *H10B 41/10* (2023.02); *H10B 41/27* (2023.02); *H10B 41/35* (2023.02); *H10B 41/40* (2023.02); *H10B 43/10* (2023.02); *H10B 43/27* (2023.02); *H10B 43/35* (2023.02); *H10B 43/40* (2023.02)

(58) Field of Classification Search
CPC ............... H01L 2224/065; H01L 25/18; H01L 2225/06506; H01L 2225/0651; H01L 2225/06562; H01L 2225/06586; H10B 80/00; H10B 41/10; H10B 41/27; H10B 41/35; H10B 41/40; H10B 43/10; H10B 43/27; H10B 43/35; H10B 43/40; H10B 41/41; H10B 41/20; H10B 43/20; H10B 41/50; H10B 43/50

See application file for complete search history.

(56) References Cited

U.S. PATENT DOCUMENTS

| | | | |
|---|---|---|---|
| 9,202,536 | B2 | 12/2015 | Helm et al. |
| 9,397,110 | B2 | 7/2016 | Lue |
| 10,651,153 | B2 | 5/2020 | Fastow et al. |
| 11,579,312 | B1 * | 2/2023 | Bigley ............... G01S 19/00 |
| 11,579,812 | B2 * | 2/2023 | Balakrishnan ........ G06F 3/0679 |
| 11,901,210 | B2 * | 2/2024 | Or-Bach ................. G11C 5/06 |
| 11,942,154 | B2 * | 3/2024 | Jeon ........................ G11C 5/063 |
| 11,960,776 | B2 * | 4/2024 | Sforzin ................ G11C 7/1051 |
| 11,961,552 | B2 * | 4/2024 | Oh ...................... G11C 11/4087 |
| 2020/0327943 | A1 | 10/2020 | Maejima |
| 2021/0217760 | A1 * | 7/2021 | Yang ..................... H10B 43/27 |
| 2022/0130849 | A1 * | 4/2022 | Kwon .................... G11C 16/08 |

\* cited by examiner

NONVOLATILE MEMORY DEVICE AND MEMORY PACKAGE INCLUDING THE SAME

CROSS-REFERENCE TO RELATED APPLICATION

This application claims priority under 35 USC § 119 to Korean Patent Application No. 10-2022-0103915 filed on Aug. 19, 2022 in the Korean Intellectual Property Office (KIPO), the contents of which are herein incorporated by reference in their entirety.

BACKGROUND

Example embodiments relate generally to semiconductor integrated circuits, and more particularly to nonvolatile memory devices and memory packages including the nonvolatile memory devices.

Vertical memory devices, also known as three-dimensional (3D) memory devices, are memory devices that include a plurality of memory cells stacked repeatedly on a surface of a substrate. These memory devices are able to have a very high storage capacity within a very small structure. For example, in a vertical memory device, a channel may protrude or may be extended vertically from the surface of the substrate, and gate lines and insulation layers surrounding the vertical channel may be repeatedly stacked.

However, the reduction of the size of the vertical memory device is limited because the memory device should still include a peripheral circuit for driving a memory cell array and a wiring structure to electrically connect the memory cell array with the peripheral circuit. Accordingly, there exists a demand for memory devices having a high degree of integration and excellent electrical characteristics.

SUMMARY

It is an aspect to provide a nonvolatile memory device capable of reducing size and reducing manufacturing cost.

It is another aspect to provide a memory package including the nonvolatile memory device.

According to an aspect of one or more example embodiments, there is provided a nonvolatile memory device that includes a first semiconductor layer and a second semiconductor layer. The first semiconductor layer includes a plurality of wordlines extending in a first direction, a plurality of bitlines extending in a second direction crossing the first direction, and a memory cell array connected to the plurality of wordlines and the plurality of bitlines. The memory cell array includes at least one memory block. The second semiconductor layer is beneath the first semiconductor layer in a third direction perpendicular to both the first and second directions, and includes a substrate and an address decoder on the substrate. The address decoder controls the memory cell array, and includes a plurality of pass transistors connected to the plurality of wordlines, and a plurality of drivers control the plurality of pass transistors. In the second semiconductor layer, the plurality of drivers are arranged in a first layout pattern along the first direction and the second direction, and the plurality of pass transistors are arranged in a second layout pattern along the first direction and the second direction. The first layout pattern is different from the second layout pattern, and the first layout pattern is independent of the second layout pattern.

According to another aspect of one or more example embodiments, there is provided a memory package that includes a base substrate and a plurality of memory chips stacked on the base substrate. Each of the plurality of memory chips includes a first semiconductor layer and a second semiconductor layer. The first semiconductor layer includes a plurality of wordlines extending in a first direction, a plurality of bitlines extending in a second direction crossing the first direction, and a memory cell array connected to the plurality of wordlines and the plurality of bitlines. The memory cell array includes at least one memory block. The second semiconductor layer is beneath the first semiconductor layer in a third direction perpendicular to both the first and second directions, and includes a substrate and an address decoder on the substrate. The address decoder controls the memory cell array, and includes a plurality of pass transistors connected to the plurality of wordlines, and a plurality of drivers control the plurality of pass transistors. In the second semiconductor layer, the plurality of drivers are arranged by a first layout pattern along the first and second directions, and the plurality of pass transistors are arranged by a second layout pattern along the first and second directions. The first layout pattern is different from the second layout pattern, and the first layout pattern is independent of the second layout pattern.

According to yet another aspect of one or more example embodiments, there is provided a nonvolatile memory device that includes a first semiconductor layer and a second semiconductor layer. The first semiconductor layer includes a plurality of wordlines extending in a first direction, a plurality of bitlines extending in a second direction crossing the first direction, and a memory cell array including a memory block connected to the plurality of wordlines and the plurality of bitlines. The second semiconductor layer is beneath the first semiconductor layer in a third direction perpendicular to both the first and second directions, and includes a substrate and an address decoder on the substrate. The address decoder controls the memory cell array, and includes a plurality of pass transistors connected to the plurality of wordlines, and a plurality of drivers control the plurality of pass transistors. The memory block includes a cell region including a plurality of memory cells, a first extension region adjacent to a first side of the cell region, and a second extension region adjacent to a second side of the cell region opposite the first side of the cell region. The plurality of pass transistors are disposed in a first region and a second region of the second semiconductor layer that respectively correspond to the first extension region and the second extension region, and all of the plurality of pass transistors are arranged along the second direction in the first region and the second region to correspond to an arrangement of the plurality of wordlines. The plurality of drivers are disposed in a third region of the second semiconductor layer that corresponds to the cell region and are arranged in the third region without regard to the arrangement of the plurality of wordlines, two or more of the plurality of drivers are arranged along the first direction in the third region, and two or more of the plurality of drivers are arranged along the second direction in the third region. The plurality of pass transistors and the plurality of drivers are electrically connected to each other by through-hole vias and upper conductive lines, or by lower conductive lines, the through-hole vias penetrate an insulating mold structure included in one of the first extension region and the second extension region, the upper conductive lines are disposed above the plurality of memory cells, and the lower conductive lines are disposed under the plurality of memory cells.

According to yet another aspect of one or more example embodiments, there is provided a nonvolatile memory device includes a first semiconductor layer, a second semiconductor layer and an address decoder. The first semiconductor layer includes a plurality of wordlines extending in a first direction, a plurality of bitlines extending in a second direction crossing the first direction, and a memory cell array connected to the plurality of wordlines and the plurality of bitlines. The memory cell array includes at least one memory block. The second semiconductor layer is beneath the first semiconductor layer in a third direction perpendicular to both the first and second directions. The address decoder controls the memory cell array, and includes a plurality of pass transistors connected to the plurality of wordlines, and a plurality of drivers control the plurality of pass transistors. The plurality of drivers are arranged by a first layout pattern along the first direction and the second direction, and the plurality of pass transistors are arranged by a second layout pattern along the first direction and the second direction. The first layout pattern is different from the second layout pattern, and the first layout pattern is independent of the second layout pattern. At least a portion of the address decoder is included in the first semiconductor layer or the second semiconductor layer.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
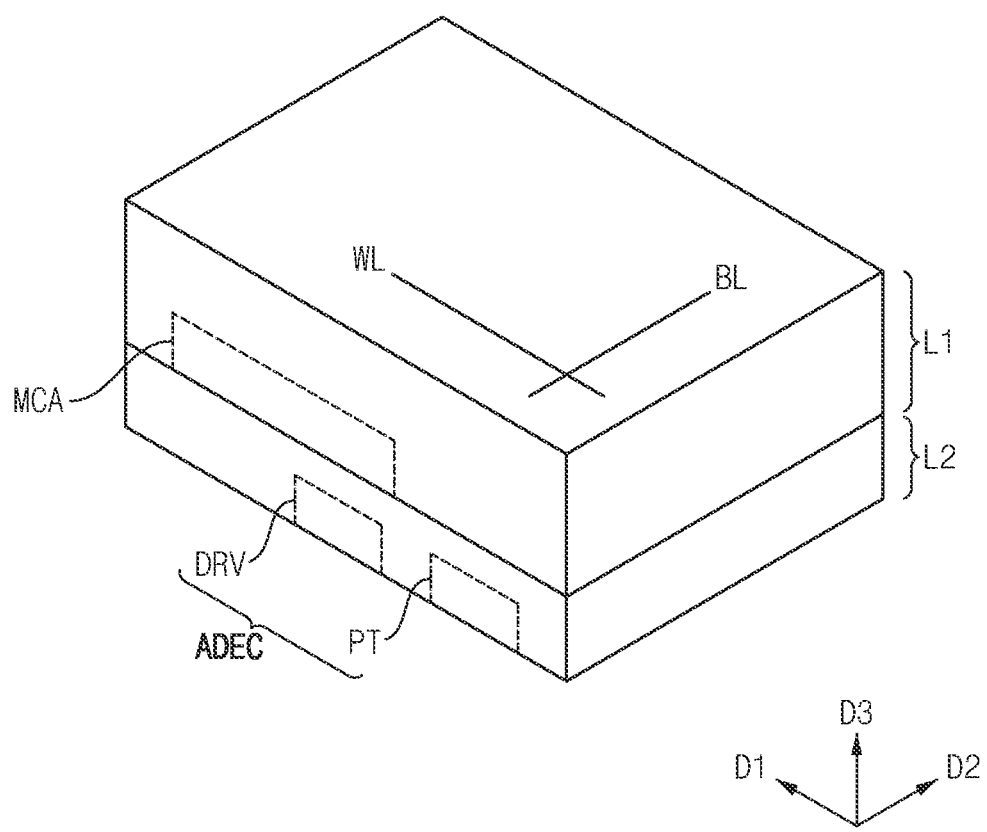
FIG. 1 is a perspective view of a nonvolatile memory device according to some example embodiments.

A nonvolatile memory device and the memory package according to some example embodiments may have or adopt a structure in which the peripheral circuit is formed below and the memory cell array is stacked on the peripheral circuit, e.g., a COP structure and/or a BVNAND structure in which the peripheral circuit and the memory cell array are disposed or arranged in a third direction. Accordingly, the nonvolatile memory device may have a relatively small size.

In some example embodiments, pass transistors and the drivers included in an address decoder may be separately formed, and the drivers may be arranged independently of the arrangement of the pass transistors. Accordingly, the degree of freedom in placement may be increased, and thus the circuit region and the manufacturing cost may be reduced.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a perspective view of a nonvolatile memory device according to some example embodiments.

In FIG. 1, two directions that are each parallel or substantially parallel to a first surface (e.g., a top surface) of a substrate and crossing each other are referred to as a first direction D1 (e.g., a X-axis direction) and a second direction D2 (e.g., a Y-axis direction). In addition, a direction vertical or substantially vertical to the first surface of the substrate is referred to as a third direction D3 (e.g., a Z-axis direction). For example, the first and second directions D1 and D2 may be perpendicular or substantially perpendicular to each other. In addition, the third direction D3 may be perpendicular or substantially perpendicular to both the first and second directions D1 and D2. Further, a direction indicated by an arrow in the figures and a reverse direction thereof are considered as the same direction. The definition of the first, second and third directions D1, D2 and D3 are same in the subsequent figures.

Referring to FIG. 1, a nonvolatile memory device 10 includes a first semiconductor layer L1 and a second semiconductor layer L2. The first semiconductor layer L1 is stacked on the second semiconductor layer L2 in the third direction D3, and the second semiconductor layer L2 is disposed under (e.g., directly beneath or indirectly beneath) the first semiconductor layer L1 in the third direction D3.

The first semiconductor layer L1 may include a memory cell array MCA, and the second semiconductor layer L2 may include a peripheral circuit. Thus, the first semiconductor layer L1 may be referred to as a memory cell region (MCR), and the second semiconductor layer L2 may be referred to as a peripheral circuit region (PCR).

In some example embodiments, the peripheral circuit may include an address decoder ADEC, which may be on (e.g., directly on) a lower substrate. However, example embodiments are not limited thereto, and the peripheral circuit may further include a control circuit, a page buffer circuit, and the like, as will be described with reference to FIG. 2.

In some example embodiments, as will be described with reference to FIG. 11, the second semiconductor layer L2 may include a lower substrate, and the peripheral circuit and various circuits may be formed on the second semiconductor layer L2 by forming semiconductor elements (e.g., transistors) and patterns for wiring the semiconductor elements on the lower substrate.

After the circuits are formed on the second semiconductor layer L2, the first semiconductor layer L1 including the memory cell array MCA, a plurality of wordlines WL and a plurality of bitlines BL may be formed.

In some example embodiments, as will be described with reference to FIG. 11, the first semiconductor layer L1 may include an upper substrate, and the memory cell array MCA may be formed on the first semiconductor layer L1, such that the memory cell array MCA is on (e.g., directly on) the upper substrate, by forming a plurality of gate conductive layers stacked on the upper substrate and a plurality of pillars that pass through the plurality of gate conductive layers and extend in a vertical direction (e.g., the third direction D3) perpendicular to a top surface of the upper substrate. In some example embodiments, each of the plurality of wordlines WL may extend in the first direction D1, and the plurality of wordlines WL may be arranged along the second direction D2. In addition, each of the plurality of bitlines BL may extend in the second direction D2, and the plurality of bitlines BL may be arranged along the first direction D1.

Further, the first semiconductor layer L1 may include patterns for electrically connecting the memory cell array MCA (e.g., the plurality of wordlines WL and the plurality of bitlines BL) with the circuits formed in the second semiconductor layer L2.

The address decoder ADEC may include a plurality of pass transistors PT and a plurality of drivers DRV. The plurality of pass transistors PT may be connected to the plurality of wordlines WL, and the plurality of drivers DRV may control the plurality of pass transistors PT (e.g., may control switching operations of the plurality of pass transistors PT). In the second semiconductor layer L2, the plurality of drivers DRV may be arranged by a first layout pattern along the first and second directions D1 and D2, and the plurality of pass transistors PT may be arranged by a second layout pattern along the first and second directions D1 and D2. The first layout pattern may be different from the second layout pattern, and the arrangement of the plurality of drivers DRV may be independent of the arrangement of the plurality of pass transistors PT. That is, in some example embodiments, the plurality of drivers DRV may be independently arranged with respect to the plurality of pass transistors PT and vice versa. In other words, in some example embodiments, the plurality of drivers DRV may be arranged without regard to an arrangement of the plurality of transistors PT and vice versa. Thus, in some example embodiments, the first layout pattern may be independent of the second layout pattern.

Detailed configurations and arrangements of the address decoder ADEC will be described with reference to FIGS. 2, 5, 6, and/or the like.

The nonvolatile memory device 10 according to some example embodiments may have or adopt a structure in which the peripheral circuit is formed below and the memory cell array MCA is stacked on the peripheral circuit, e.g., a cell over periphery (COP) structure and/or a bonding vertical NAND (BVNAND) structure in which the peripheral circuit and the memory cell array MCA are disposed or arranged in the third direction D3. Accordingly, the nonvolatile memory device 10 may have a relatively small size. The BVNAND structure will be described with reference to FIG. 22.

Figure 2:
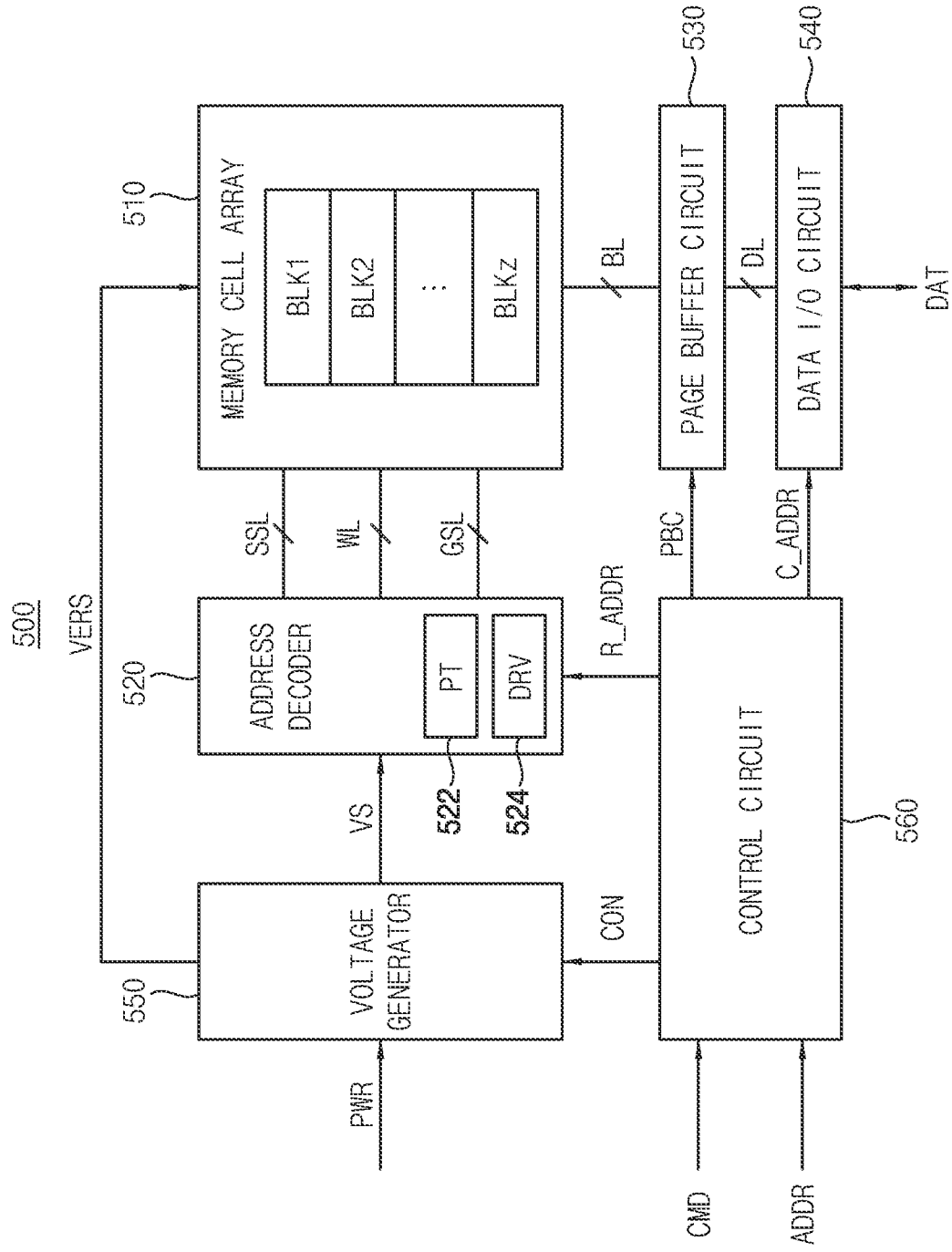
FIG. 2 is a block diagram illustrating a nonvolatile memory device according to some example embodiments.

FIG. 2 is a block diagram illustrating a nonvolatile memory device according to some example embodiments.

Referring to FIG. 2, a nonvolatile memory device 500 includes a memory cell array 510, an address decoder 520, a page buffer circuit 530, a data input/output (I/O) circuit 540, a voltage generator 550 and a control circuit 560.

The nonvolatile memory device 500 may have the above-described COP structure and/or the BVNAND structure. In some example embodiments, the memory cell array 510 may be formed in the first semiconductor layer L1, and the address decoder 520, the page buffer circuit 530, the data I/O circuit 540, the voltage generator 550 and the control circuit 560 may be formed in the second semiconductor layer L2.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz (z being any positive integer) each of which includes memory cells. In addition, each of the plurality of memory blocks BLK1, BLK2, . . . , BLKz may be divided into a plurality of pages.

In some example embodiments, as will be described with reference to FIGS. 3 and 4, the memory cell array 510 may be a three-dimensional memory cell array, which is formed on a substrate in a three-dimensional structure (or a vertical structure). In this example, the memory cell array 510 may include a plurality of cell strings (e.g., a plurality of vertical NAND strings) that are vertically oriented such that at least one memory cell is located over another memory cell.

The control circuit 560 may receive a command CMD and an address ADDR from an outside (e.g., from a host device and/or a memory controller), and control erasure, programming and read operations of the nonvolatile memory device 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

In some example embodiments, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. In some example embodiments, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The address decoder 520 may include a plurality of pass transistors (PT) 522 and a plurality of drivers (DRV) 524. The plurality of pass transistors (PT) 522 and the plurality of drivers (DRV) 524 may correspond respectively to the pass transistors (PT) and drivers (DRV) in FIG. 1. Detailed configurations of the plurality of pass transistors 522 and the plurality of drivers 524 will be described with reference to FIG. 5.

The voltage generator 550 may generate voltages VS that are used for an operation of the nonvolatile memory device 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is used for the data erase operation based on the power PWR and the control signals CON.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory device 500.

The data I/O circuit 540 may be connected to the page buffer circuit 530 via data lines DL. The data I/O circuit 540 may provide the data DAT from an outside of the nonvolatile memory device 500 to the memory cell array 510 via the page buffer circuit 530 or may provide the data DAT from the memory cell array 510 to the outside of the nonvolatile memory device 500, based on the column address C_ADDR.

Figure 3:
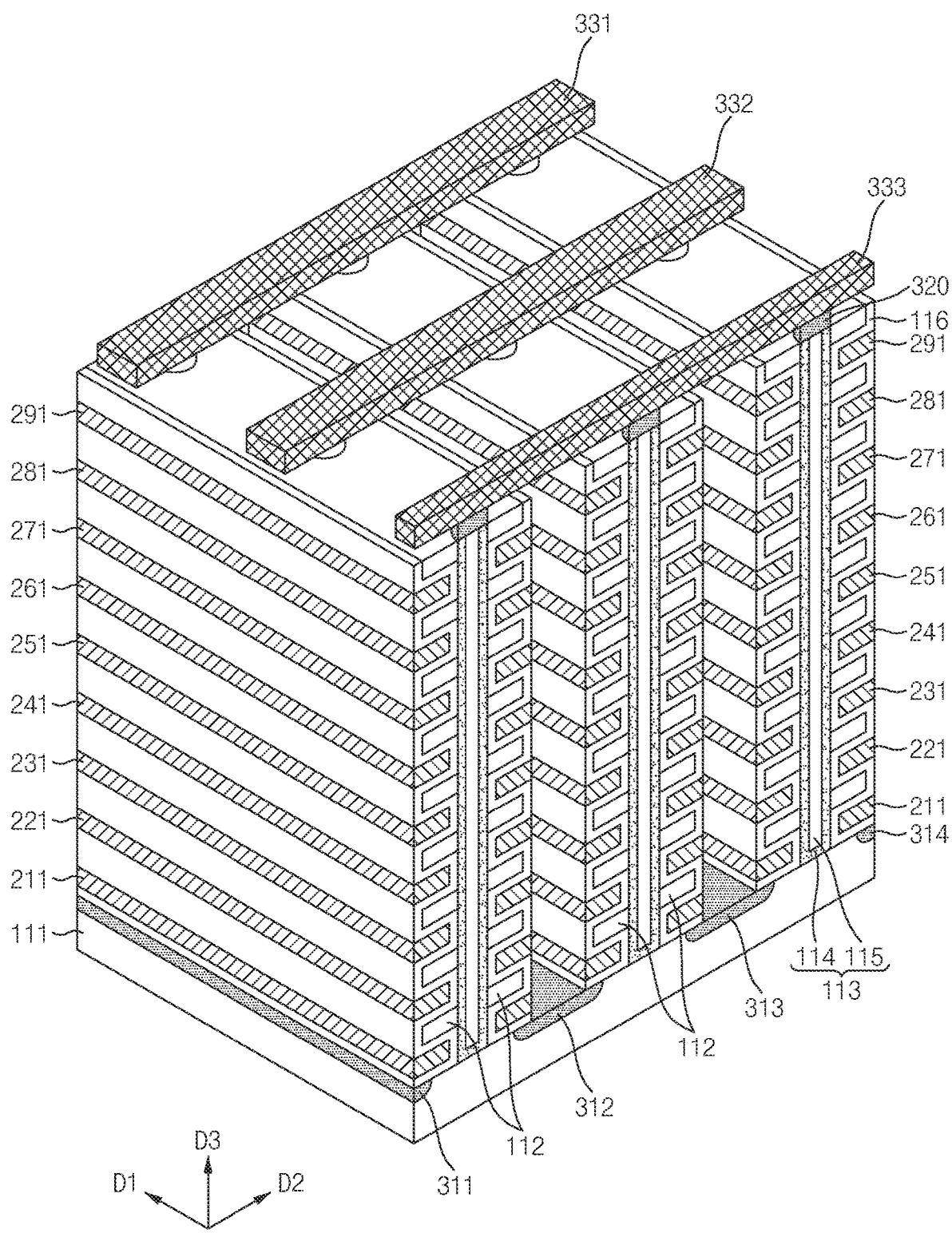
FIG. 3 is a perspective view of an example of a memory block included in a memory cell array of a nonvolatile memory device of FIG. 2, according to some example embodiments.

FIG. 3 is a perspective view of an example of a memory block included in a memory cell array of a nonvolatile memory device of FIG. 2.

Referring to FIG. 3, a memory block BLKi includes a plurality of cell strings (e.g., a plurality of vertical NAND strings) which are formed on a substrate in a three-dimensional structure (or a vertical structure). The memory block BLKi includes structures extending along the first, second and third directions D1, D2 and D3.

A substrate 111 (e.g., the upper substrate of the first semiconductor layer L1) is provided. In some example embodiments, the substrate 111 may have a well of a first type of charge carrier impurity (e.g., a first conductivity type) therein. In some example embodiments, the substrate 111 may have a p-well formed by implanting a group 3 element such as boron (B). In particular, the substrate 111 may have a pocket p-well provided within an n-well. In some example embodiments, the substrate 111 has a p-type well (or a p-type pocket well). However, the conductive type of the substrate 111 is not limited to p-type.

A plurality of doping regions 311, 312, 313 and 314 arranged along the second direction D2 are provided in/on the substrate 111. These plurality of doping regions 311 to 314 may have a second type of charge carrier impurity (e.g., a second conductivity type) different from the first type of the substrate 111. In some example embodiments, the first to fourth doping regions 311 to 314 may have n-type. However, the conductive type of the first to fourth doping regions 311 to 314 is not limited to n-type.

A plurality of insulation materials 112 extending along the first direction D1 are sequentially provided along the third direction D3 on a region of the substrate 111 between the first and second doping regions 311 and 312. In some example embodiments, the plurality of insulation materials 112 are provided along the third direction D3, being spaced by a specific distance. In some example embodiments, the insulation materials 112 may include an insulation material such as an oxide layer.

A plurality of pillars 113 penetrating the insulation materials along the third direction D3 are sequentially disposed along the first direction D1 on a region of the substrate 111 between the first and second doping regions 311 and 312. In some example embodiments, the plurality of pillars 113 penetrate the insulation materials 112 to contact the substrate 111.

In some example embodiments, each pillar 113 may include a plurality of materials. In some example embodiments, a channel layer 114 of each pillar 113 may include a silicon material having a first conductivity type. In some example embodiments, the channel layer 114 of each pillar 113 may include a silicon material having the same conductivity type as the substrate 111. In some example embodiments, the channel layer 114 of each pillar 113 includes p-type silicon. However, the channel layer 114 of each pillar 113 is not limited to the p-type silicon.

An internal material 115 of each pillar 113 includes an insulation material. In some example embodiments, the internal material 115 of each pillar 113 may include an insulation material such as a silicon oxide. In some examples, the internal material 115 of each pillar 113 may include an air gap. The term "air" as discussed herein, may refer to atmospheric air, or other gases that may be present during the manufacturing process.

An insulation layer 116 is provided along the exposed surfaces of the insulation materials 112, the pillars 113, and the substrate 111, on a region between the first and second doping regions 311 and 312. In some example embodiments, the insulation layer 116 provided on surfaces of the insulation material 112 may be interposed between pillars 113 and a plurality of stacked first conductive materials 211, 221, 231, 241, 251, 261, 271, 281 and 291, as illustrated. In some examples, the insulation layer 116 need not be provided between the first conductive materials 211 to 291 corresponding to ground selection lines GSL (e.g., 211) and string selection lines SSL (e.g., 291). In this example, the ground selection lines GSL are the lowermost ones of the stack of first conductive materials 211 to 291 and the string selection lines SSL are the uppermost ones of the stack of first conductive materials 211 to 291.

The plurality of first conductive materials 211 to 291 are provided on surfaces of the insulation layer 116, in a region between the first and second doping regions 311 and 312. In some example embodiments, the first conductive material 211 extending along the first direction D1 is provided between the insulation material 112 adjacent to the substrate 111 and the substrate 111. In more detail, the first conductive material 211 extending along the first direction D1 is provided between the insulation layer 116 at the bottom of the insulation material 112 adjacent to the substrate 111 and the substrate 111.

A first conductive material extending along the first direction D1 is provided between the insulation layer 116 at the top of the specific insulation material among the insulation materials 112 and the insulation layer 116 at the bottom of a specific insulation material among the insulation materials 112. In some example embodiments, a plurality of first conductive materials 221 to 281 extending along the first direction D1 are provided between the insulation materials 112 and it may be understood that the insulation layer 116 is provided between the insulation materials 112 and the first conductive materials 221 to 281. The first conductive materials 211 to 291 may be formed of a conductive metal, but in other embodiments the first conductive materials 211 to 291 may include a conductive material such as a poly-silicon.

The same structures as those on the first and second doping regions 311 and 312 may be provided in a region between the second and third doping regions 312 and 313. In the region between the second and third doping regions 312 and 313, a plurality of insulation materials 112 are provided, which extend along the first direction D1. And, a plurality of pillars 113 are provided that are disposed sequentially along the first direction D1 and penetrate the plurality of insulation materials 112 along the third direction D3. An insulation layer 116 is provided on the exposed surfaces of the plurality of insulation materials 112 and the plurality of pillars 113, and a plurality of first conductive materials 211 to 291 extend along the first direction D1. Similarly, the same structures as those on the first and second doping regions 311 and 312 may be provided in a region between the third and fourth doping regions 313 and 314.

A plurality of drain regions 320 are provided on the plurality of pillars 113, respectively. The drain regions 320 may include silicon materials doped with a second type of charge carrier impurity. In some example embodiments, the drain regions 320 may include silicon materials doped with an n-type dopant. In some example embodiments, the drain regions 320 include n-type silicon materials. However, the drain regions 320 are not limited to n-type silicon materials.

On the drain regions, a plurality of second conductive materials 331, 332 and 333 are provided, which extend along the second direction D2. The second conductive materials 331 to 333 are disposed along the first direction D1, being spaced apart from each other by a specific distance. The second conductive materials 331 to 333 are respectively connected to the drain regions 320 in a corresponding region. The drain regions 320 and the second conductive material 333 extending along the second direction D2 may be connected through each contact plug. Each contact plug may be, in some example embodiments, a conductive plug formed of a conductive material such as a metal. The second conductive materials 331 to 333 may include metal materials. The second conductive materials 331 to 333 may include conductive materials such as a polysilicon.

In the example of FIG. 3, the first conductive materials 211 to 291 may be used to form the wordlines WL, the string selection lines SSL and the ground selection lines GSL. In some example embodiments, the first conductive materials 221 to 281 may be used to form the wordlines WL, where conductive materials belonging to the same layer may be interconnected. The second conductive materials 331 to 333 may be used to form the bitlines BL. The number of layers of the first conductive materials 211 to 291 may be changed variously according to process and control techniques.

Figure 4:
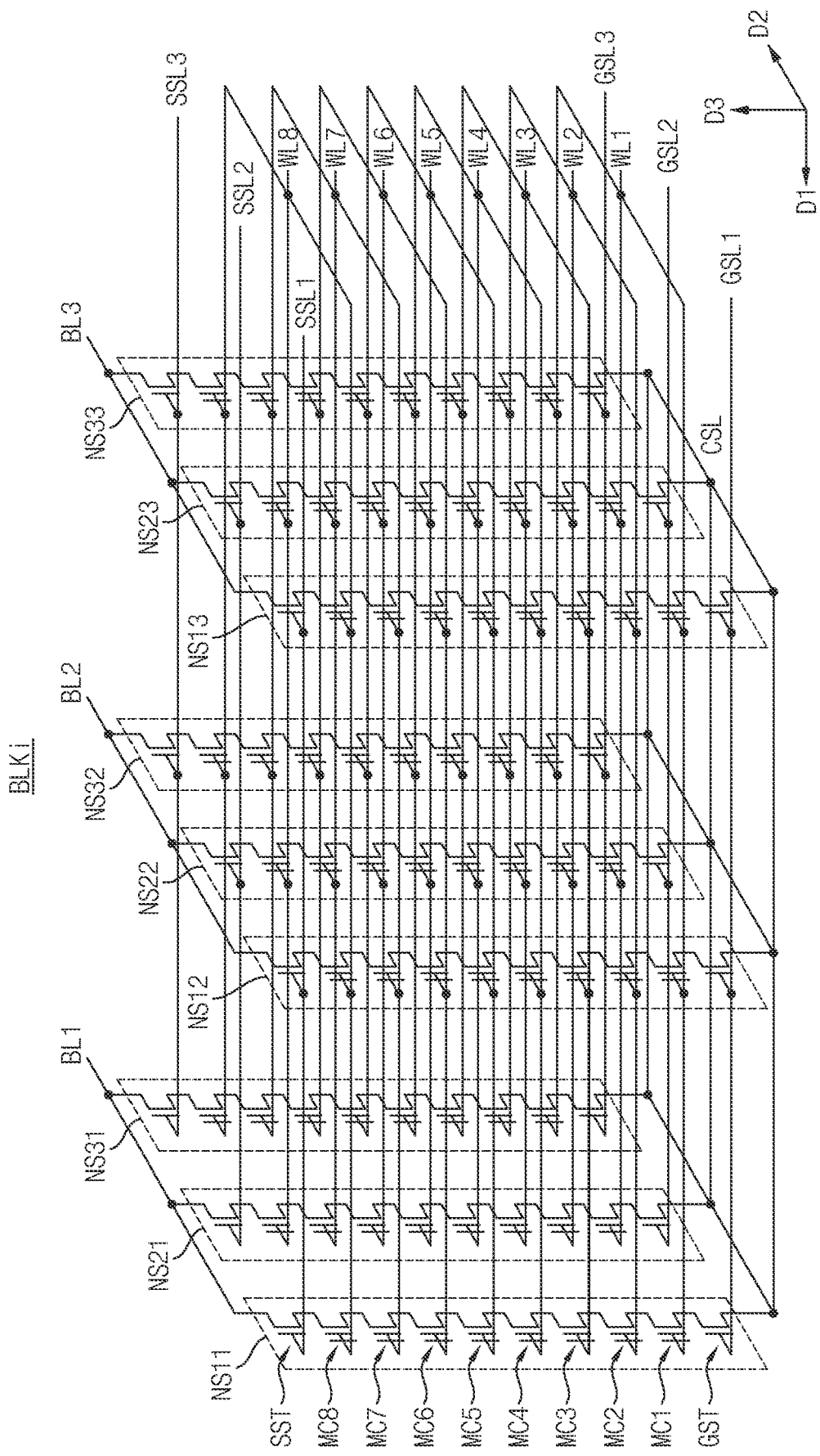
FIG. 4 is a circuit diagram illustrating an equivalent circuit of a memory block described with reference to FIG. 3, according to some example embodiments.

FIG. 4 is a circuit diagram illustrating an equivalent circuit of a memory block described with reference to FIG. 3, according to some example embodiments.

A memory block BLKi of FIG. 4 may be formed on a substrate in a three-dimensional structure (or a vertical structure). See FIG. 3. In some example embodiments, a plurality of NAND strings included in the memory block BLKi may be formed in a direction perpendicular to the substrate.

Referring to FIG. 4, the memory block BLKi may include a plurality of NAND strings NS11, NS12, NS13, NS21, NS22, NS23, NS31, NS32 and NS33 connected between bitlines BL1, BL2 and BL3 and a common source line CSL. Each of the NAND strings NS11 to NS33 may include a string selection transistor SST, a plurality of memory cells MC1, MC2, MC3, MC4, MC5, MC6, MC7 and MC8, and a ground selection transistor GST. In some example embodiments, the bitlines BL1 to BL3 may correspond to the second conductive materials 331 to 333 in FIG. 3, and the common source line CSL may be formed by interconnecting the first to fourth doping regions 311 to 314 in FIG. 3.

Each string selection transistor SST may be connected to a corresponding string selection line (one of SSL1, SSL2 and SSL3). The plurality of memory cells MC1 to MC8 may be connected to corresponding wordlines WL1, WL2, WL3, WL4, WL5, WL6, WL7 and WL8, respectively. Each ground selection transistor GST may be connected to a corresponding ground selection line (one of GSL1, GSL2 and GSL3). Each string selection transistor SST may be connected to a corresponding bitline (e.g., one of BL1 to BL3), and each ground selection transistor GST may be connected to the common source line CSL. In the example of FIG. 4, some of the string selection transistors SST are connected to the same bitline (e.g., one of BL1 to BL3) to connect corresponding NAND strings to the same bitline up appropriate selection via selection voltages applied to the appropriate sting selection lines SSL1 to SSL3 and ground selection lines GSL1 to GSL3.

The cell strings connected in common to one bitline may form one column, and the cell strings connected to one string selection line may form one row. In some example embodiments, the cell strings NS11, NS21 and NS31 connected to the first bitline BL1 may correspond to a first column, and the cell strings NS11, NS12 and NS13 connected to the first string selection line SSL1 may form a first row.

Wordlines (e.g., WL1) having the same height may be commonly connected, and the ground selection lines GSL1 to GSL3 and the string selection lines SSL1 to SSL3 may be separated. Memory cells located at the same semiconductor layer share a wordline. Cell strings in the same row share a string selection line. The common source line CSL is connected in common to all of cell strings.

In FIG. 4, the memory block BLKi is illustrated to be connected to eight wordlines WL1 to WL8 and three bitlines BL1 to BL3, and each of the NAND strings NS11 to NS33 is illustrated to include eight memory cells MC1 to MC8. However, example embodiments are not limited thereto. In some example embodiments, each memory block may be connected to any number of wordlines and bitlines, and each NAND string may include any number of memory cells.

A three-dimensional vertical array structure may include vertical NAND strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

Although the memory cell array included in the nonvolatile memory device according to some example embodiments is described based on a NAND flash memory device, the nonvolatile memory device according to some example embodiments may be any nonvolatile memory device, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Figure 5:
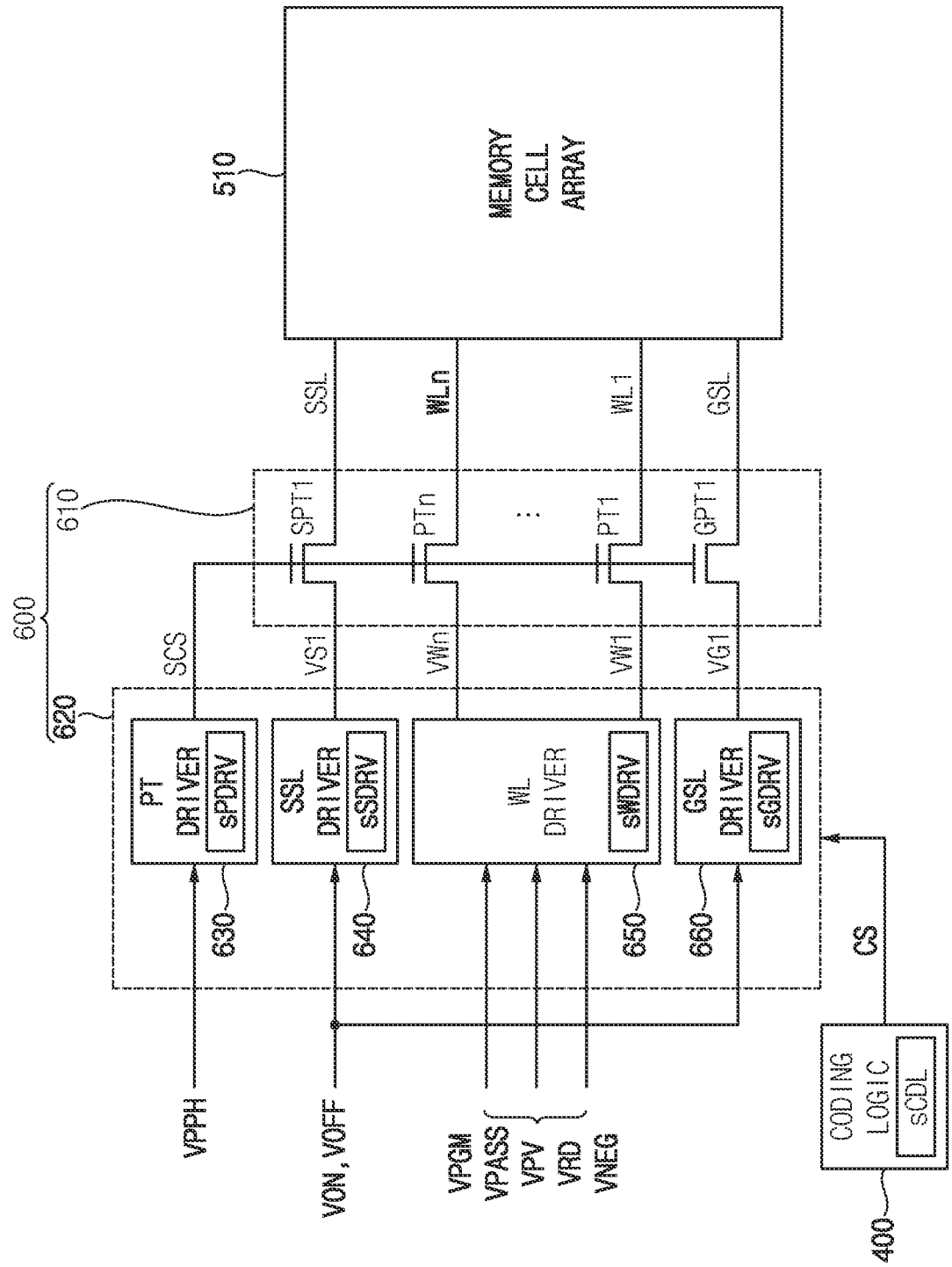
FIG. 5 is a block diagram illustrating an example of an address decoder included in a nonvolatile memory device of FIG. 2, according to some example embodiments.

FIG. 5 is a block diagram illustrating an example of an address decoder included in a nonvolatile memory device of FIG. 2, according to some example embodiments.

Referring to FIG. 5, an address decoder 600 may be connected to the memory cell array 510 through a string selection line SSL, wordlines WL1, . . . , WLn, and a ground selection line GSL, and may include a pass switch circuit 610 and a driver circuit 620. The address decoder 600 may be referred to as a row decoder, a wordline decoder, or the like.

The pass switch circuit 610 may include a plurality of pass transistors SPT1, PT1, . . . , PTn, and GPT1. The plurality of pass transistors SPT1, PT1 to PTn, and GPT1 may include a string pass transistor SPT1 connected to the string selection line SSL, wordline pass transistors PT1 to PTn connected to the wordlines WL1 to WLn, and a ground pass transistor GPT1 connected to the ground selection line GSL.

The driver circuit 620 may control switching operations of the plurality of pass transistors SPT1, PT1 to PTn, and GPT1, and may control operations of supplying voltages VS1, VW1, . . . , VWn, VG1 to the memory cell array 510 through the plurality of pass transistors SPT1, PT1 to PTn, and GPT1. The driver circuit 620 may include a pass transistor driver 630, a string selection line driver 640, a wordline driver 650 and a ground selection line driver 660.

The pass transistor driver 630 may generate a plurality of switching control signals SCS based on a high-voltage VPPH provided from a voltage generator (e.g., the voltage generator 550 in FIG. 2). The plurality of switching control signals SCS may be applied to gate electrodes of the plurality of pass transistors SPT1, PT1 to PTn, and GPT1. The switching operations of the plurality of pass transistors SPT1, PT1 to PTn, and GPT1 may be controlled in response to the plurality of switching control signals SCS. The timing at which the voltages VS1, VW1 to VWn, and VG1 are applied to the memory cell array 510 may be controlled by the switching operations of the plurality of pass transistors SPT1, PT1 to PTn, and GPT1.

The plurality of pass transistors SPT1, PT1 to PTn, and GPT1 may be configured such that the string selection line SSL the wordlines WL1 to WLn, and the ground selection line GSL are electrically connected to the string selection line driver 640, the wordline driver 650 and the ground selection line driver 660, respectively, in response to activations of the plurality of switching control signals SCS. For example, the plurality of switching control signals SCS may be generated based on the high-voltage VPPH and may have a voltage level corresponding to the high-voltage VPPH, and thus the plurality of pass transistors SPT1, PT1 to PTn, and GPT1 may include a high-voltage transistor capable of enduring the high-voltage.

The string selection line driver 640 may output one of an on-voltage VON and an off-voltage VOFF provided from the voltage generator as a string selection voltage VS. When the string pass transistor SPT1 is turned on, the string selection voltage VS1 may be applied to the memory cell array 510 through the string selection line SSL. When the string pass transistor SPT1 is turned on, the string selection voltage VS1 may be applied to the memory cell array 510 through the string selection line SSL. For example, during a program operation, the string selection line driver 640 may supply the string selection voltage VS1 so as to turn on all string selection transistors in a selected memory block.

The wordline driver 650 may output one of a program voltage VPGM, a pass voltage VPASS, a verification voltage VPV, a read voltage VRD, and a negative voltage VNEG provided from the voltage generator to a respective one of the wordlines WL1 to WLn, according to an operation of a nonvolatile memory device (e.g., the nonvolatile memory device 500 of FIG. 2). When one of the wordline pass transistors PT1 to PTn are turned on, a respective one of wordline voltages VW1 to VWn may be provided to the memory cell array 510 through a respective one of the wordlines WL1 to WLn.

The ground selection line driver 660 may output one of the on-voltage VON and the off-voltage VOFF provided from the voltage generator as a ground selection voltage GS1. When the ground pass transistor GPT1 is turned on, the ground selection voltage GS1 may be applied to the memory cell array 510 through the ground selection line GSL.

In some example embodiments, the pass transistor driver 630, the string selection line driver 640, the wordline driver 650, and the ground selection line driver 660 may include a plurality of pass transistor sub-drivers sPDRV, a plurality of string selection line sub-drivers sSDRV, a plurality of wordline sub-drivers sWDRV, and a plurality of ground selection line sub-drivers sGDRV, respectively. Each of the plurality of sub-drivers sPDRV, sSDRV, sWDRV and sGDRV may control a part or portion of the memory cell array 510.

In some example embodiments, the address decoder 600 may operate based on a coding signal CS generated by a coding logic 400. For example, based on the coding signal CS, the plurality of switching control signals SCS may be generated, the switching operations of the plurality of pass transistors SPT1, PT1 to PTn, and GPT1 may be controlled, and the timing at which the voltages VS1, VW1 to VWn, and VG1 are applied to the memory cell array 510 may be controlled. For example, the coding logic 400 may correspond to a command decoder, an address buffer, or the like, included in a control circuit (e.g., the control circuit 560 in FIG. 2), or may correspond other components for controlling the address decoder 600.

In some example embodiments, the coding logic 400 may include a plurality of coding sub-logics sCDL. Each of the plurality of coding sub-logics sCDL may control some of the plurality of sub-drivers sPDRV, sSDRV, sWDRV and sGDRV.

Figure 6:
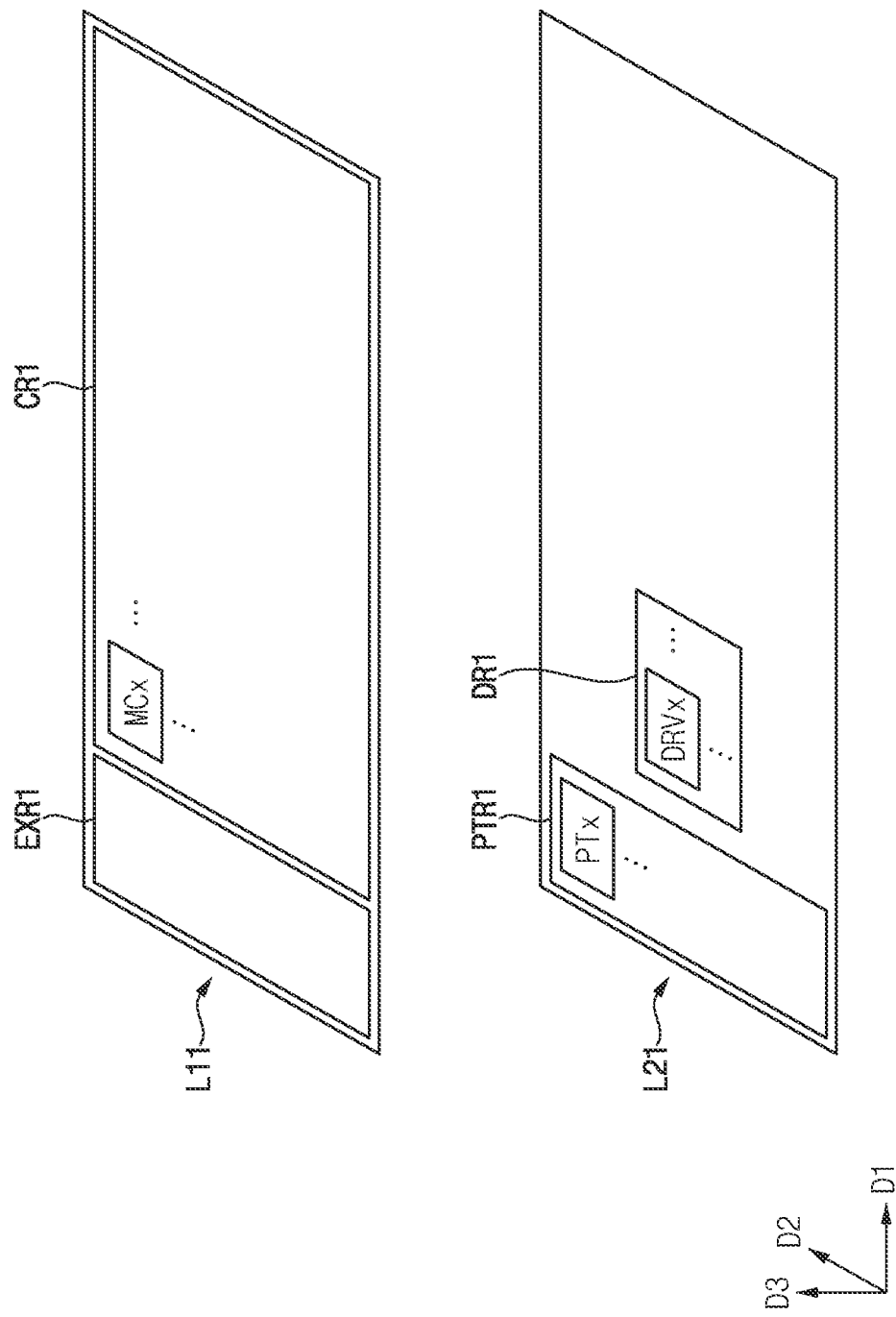
FIG. 6 is a perspective view of a layout arrangement of components in a nonvolatile memory device according to some example embodiments.

FIG. 6 is a perspective view of a layout arrangement of components in a nonvolatile memory device according to some example embodiments.

Referring to FIG. 6, an example of a layout arrangement of the first and second semiconductor layers L1 and L2 in the nonvolatile memory device 10 of FIG. 1 is illustrated.

A first semiconductor layer L11 may correspond to the first semiconductor layer L1 in FIG. 1. A first memory block included in the memory cell array MCA may be formed or included in the first semiconductor layer L11. For example, the first memory block may correspond to one memory block described with reference to FIGS. 2 through 4.

The first memory block may include a first cell region CR1 including memory cells MCx, and a first extension region EXR1 adjacent to a first side of the first cell region CR1. In some example embodiments, the first extension region EXR1 may not include the memory cells MCx, and structures for electrically connecting the wordlines WL with other components/circuits may be formed or included in the first extension region EXR1.

However, example embodiments are not limited thereto. In some example embodiments, two or more memory blocks may be disposed in the first cell region CR1 and the first extension region EXR1. In some example embodiments, memory blocks disposed in the first cell region CR1 and the first extension region EXR1 may be grouped and defined as one mat.

A second semiconductor layer L21 may correspond to the second semiconductor layer L2 in FIG. 1. First pass transistors PTx connected to first wordlines connected to the first memory block, and first drivers DRVx controlling the first pass transistors PTx may be formed or included in the second semiconductor layer L21. For example, the first pass transistors PTx may correspond to some of the plurality of pass transistors SPT1, PT1 to PTn, and GPT1 in FIG. 5, and the first drivers DRVx may correspond to some of the plurality of sub-drivers sPDRV, sSDRV, sWDRV, and sGDRV in FIG. 5.

The first pass transistors PTx and the first drivers DRVx may be separately and independently formed in terms of layout and circuit. For example, the first pass transistors PTx may be disposed in a first region PTR1 of the second semiconductor layer L21 corresponding to the first extension region EXR1, and the first drivers DRVx may be disposed in a second region DR1 of the second semiconductor layer L21 corresponding to the first cell region CR1. For example, the first region PTR1 may correspond to a portion or all of the first extension region EXR1, a size of the first region PTR1 may be smaller than or equal to that of the first extension region EXR1, and the first region PTR1 may be included in the first extension region EXR1 when the first and second semiconductor layers L11 and L21 are overlapped and viewed on the same plane. Similarly, the second region DR1 may correspond to a portion of the first cell region CR1, a size of the second region DR1 may be smaller than that of the first cell region CR1, and the second region DR1 may be included in the first cell region CR1 when the first and second semiconductor layers L11 and L21 are overlapped and viewed on the same plane. The first region PTR1 and the second region DR1 may be referred to as a pass transistor region and a driver region, respectively.

In the second semiconductor layer L21, the first drivers DRVx may be arranged in a first layout pattern along the first and second directions D1 and D2, and the first pass transistors PTx may be arranged in a second layout pattern along the first and second directions D1 and D2. The first layout pattern may be different from the second layout pattern, and an arrangement of the first drivers DRVx may be independent of an arrangement of the first pass transistors PTx. That is, the first layout pattern may be independent of the second layout pattern. For example, the size and position of the second region DR1 where the first drivers DRVx are disposed may be different from the size and position of the first region PTR1 where the first pass transistors PTx are disposed, and the arrangement of the first drivers DRVx in the second region DR1 may be different from the arrangement of the first pass transistors PTx in the first region PTR1, which will be described later.

Figure 7:
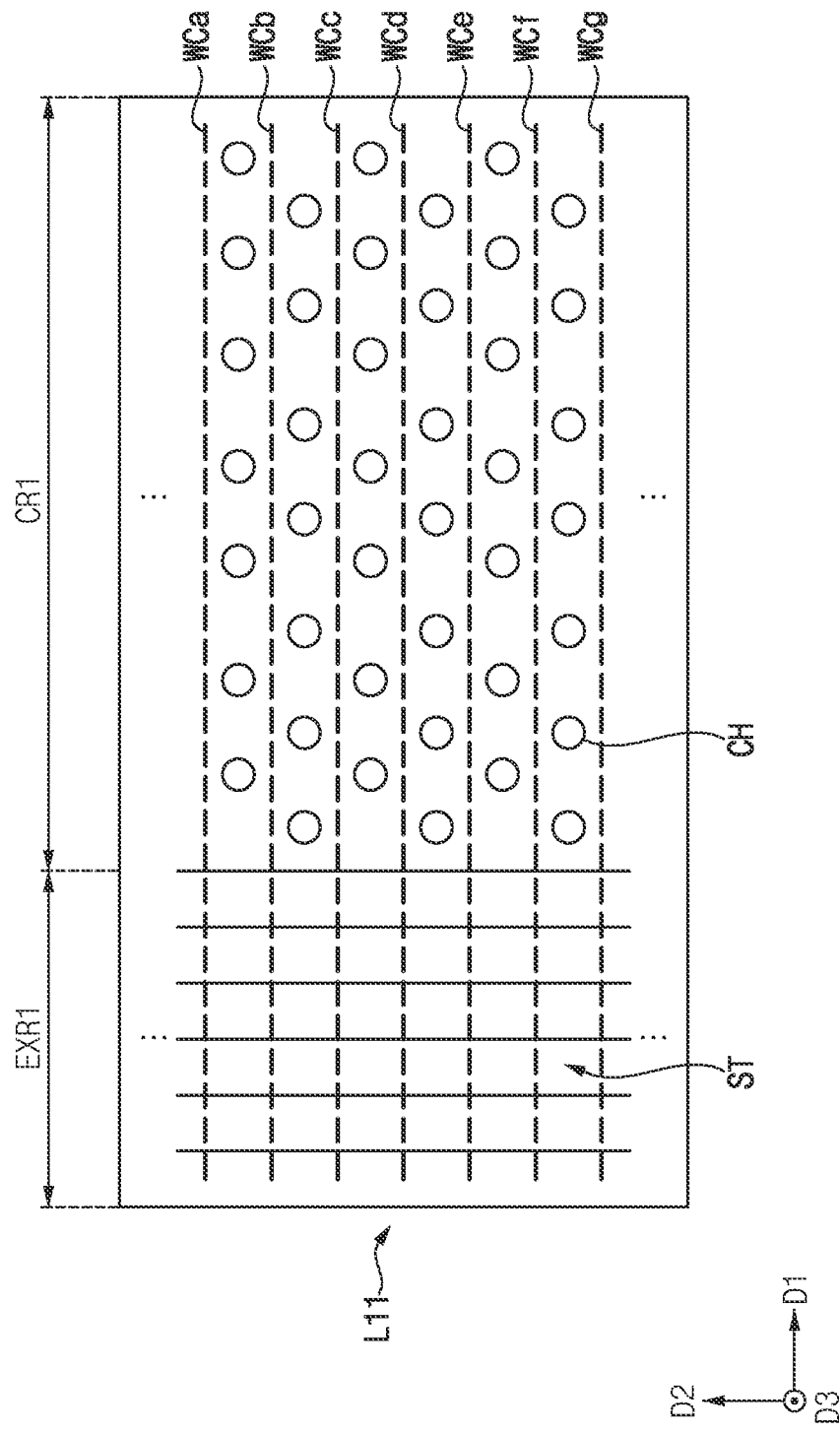
FIGS. 7 and 8 are plan views of examples of a first semiconductor layer and a second semiconductor layer in FIG. 6, according to some example embodiments.
Figure 8:
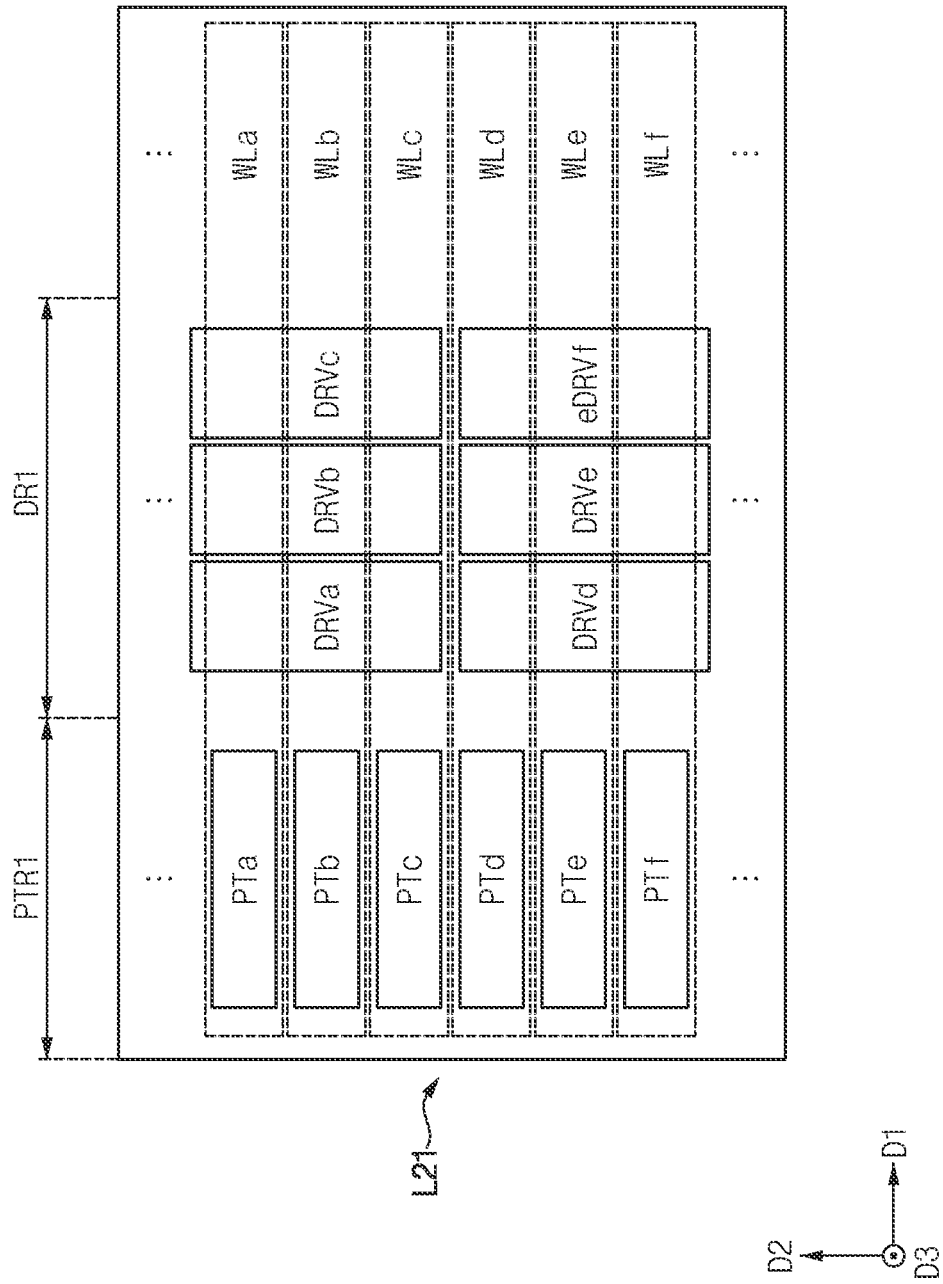

FIGS. 7 and 8 are plan views of examples of a first semiconductor layer and a second semiconductor layer in FIG. 6, according to some example embodiments.

Referring to FIG. 7, a plan view of the first cell region CR1 and the first extension region EXR1 included in the first memory block in the first semiconductor layer L11 of FIG. 6 is illustrated.

A plurality of vertical channels CH for the memory cells MCx may be provided in the first cell region CR1. The vertical channels CH may correspond to the pillars 113 in FIG. 3, and may serve as regions where channels of the NAND string are formed.

A step structure ST in which conductive materials for forming the wordlines WL are stacked in a step shape may be provided in the first extension region EXR1. The conductive materials may correspond to the first conductive materials 211 to 291 in FIG. 3. In the first cell region CR1, the conductive materials may be formed as described with reference to FIG. 3 to form the wordlines WL. However, in the first extension region EXR1, the conductive materials may be formed as the stair structure ST to electrically connect the wordlines WL with other components/circuits.

To form the first wordlines extending in the first direction D1, wordline cut regions WCa, WCb, WCc, WCd, WCe, WCf and WCg may be formed as illustrated by thick dotted lines. One wordline extending in the first direction D1 may be formed by two adjacent wordline cut regions.

Referring to FIG. 8, a plan view of the first region PTR1 and the second region DR1 in the second semiconductor layer L21 of FIG. 6 is illustrated. The first region PTR1 and the second region DR1 in FIG. 8 may correspond to the first extension region EXR1 and the first cell region CR1 in FIG. 7, respectively.

As described with reference to FIG. 7, first wordlines WLa, WLb, WLc, WLd, WLe, and WLf may be formed by the wordline cut regions WCa to WCg. For example, the first wordline WLa may be formed by the wordline cut regions WCa and WCb. Each of the first wordlines WLa to WLf may extend in the first direction D1, and the first wordlines WLa to WLf may be arranged along the second direction D2. Since the first wordlines WLa to WLf are actually formed in the first semiconductor layer L11 rather than the second semiconductor layer L21, the first wordlines WLa to WLf are illustrated schematically by dotted lines in FIG. 8 for ease of understanding.

First pass transistors PTa, PTb, PTc, PTd, PTe, and PTf may be arranged in the first region PTR1 to correspond to an arrangement of the first wordlines WLa to WLf. For example, as with the first wordlines WLa to WLf, all of the first pass transistors PTa to PTf may be arranged along the second direction D2 in the first region PTR1. For example, as described with reference to FIG. 5, one pass transistor may be connected to one wordline, and thus the first pass transistor PTa may be connected to the first wordline WLa, the second pass transistor PTb may be connected to the second wordline WLb, and so on. For example, the entire first pass transistor PTa may overlap the first wordline WLa in a plan view.

First drivers DRVa, DRVb, DRVc, DRVd, DRVe, and DRVf may be arranged in the second region DR1 without regard to (or regardless of) the arrangement of the first wordlines WLa to WLf (e.g., without regard to an arrangement of the first pass transistors PTa to PTf). For example, two or more of the first drivers DRVa to DRVf may be arranged along the first direction D1 in the second region DR1, and two or more of the first drivers DRVa to DRVf may be arranged along the second direction D2 in the second region DR2. For example, three drivers are arranged along the first direction D1 and two drivers are arranged along the second direction D2 in the example illustrated in FIG. 8, e.g., the first drivers DRVa to DRVf are arranged in a 3*2 formation in FIG. 8. However, example embodiments are not limited thereto.

In the related art, pass transistors and drivers are disposed in the first region PTR1 corresponding to the first extension region EXR1, the drivers are disposed at the edge of the first region PTR1, and one driver was disposed to be paired with one pass transistor. In addition, the driver included transistors of various types and thus had a relatively large well space.

In the nonvolatile memory device according to example embodiments, the first drivers DRVa to DRVf may be arranged independently of the arrangement of the first pass transistors PTa to PTf in the second region DR1 corresponding to the first cell region CR1. In addition, the first drivers DRVa to DRVf may be collectively disposed, and thus transistors of the same type may share a well space and a region for the well space may be reduced. Accordingly, the circuit region may be reduced and the manufacturing cost may be reduced.

For example, assuming that 100 wordlines are arranged along the second direction D2 and 100 pass transistors and 100 drivers are required to control the 100 wordlines. The pass transistors may be arranged in a 1×100 (i.e., 1 by 100) formation similar to the arrangement of wordlines. However, the drivers may be arranged in various formations such as 10×10 (i.e., 10 by 10), 5×20 (i.e., 5 by 20), 4×25 (i.e., 4 by 25), 2×50 (i.e., 2 by 50), etc., independently of the arrangement of the wordlines and the arrangement of the pass transistors. Accordingly, the degree of freedom in configuration may be increased, and thus the circuit region and the manufacturing cost may be reduced.

FIGS. 9A, 9B, 10A and 10B are diagrams for describing layout arrangements of components in a second semiconductor layer of FIG. 8.

Figure 9A:
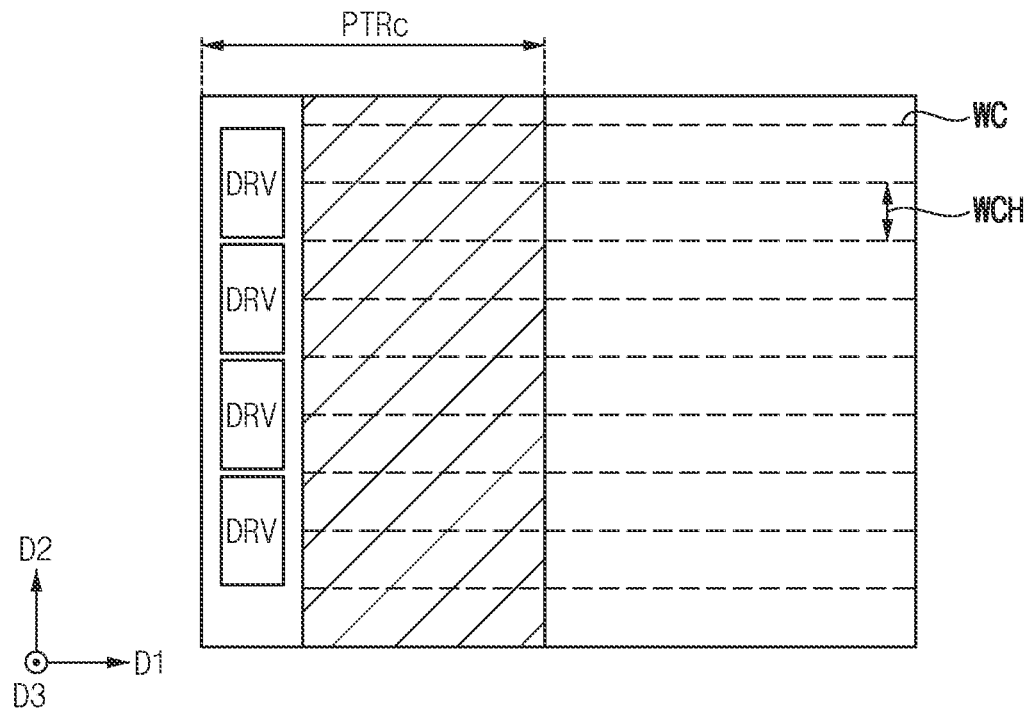
FIGS. 9A, 9B, 10A and 10B are diagrams for describing layout arrangements of components in a second semiconductor layer of FIG. 8.
Figure 9B:
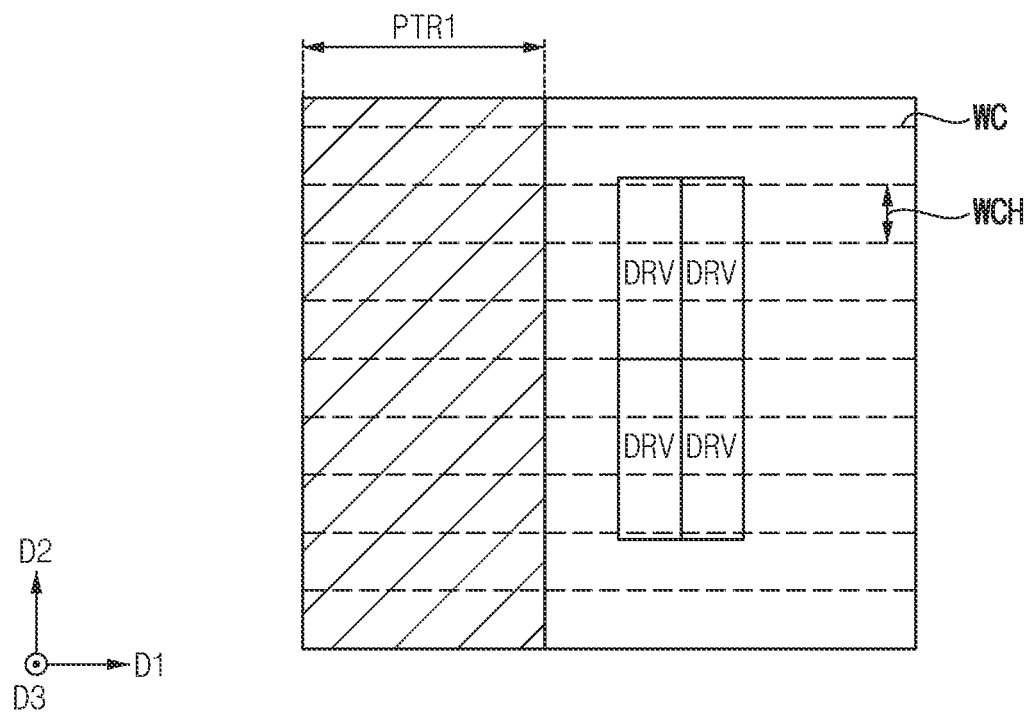

Referring to FIGS. 9A and 9B, FIG. 9A illustrates a related art method where pass transistors and drivers DRV are disposed in a first region PTRc, and FIG. 9B illustrates a method according to example embodiments where pass transistors are disposed in the first region PTR1 and drivers DRV are disposed in the second region DR1. In FIGS. 9A and 9B, a hatched region represents a region where the pass transistors are disposed.

As illustrated in FIG. 9A, the drivers DRV are arranged in a constant pattern with wordlines in the related art method. For example, assuming that a width between two adjacent wordline cut regions WC is 'WCH', each driver DRV was arranged to correspond to '2×WCH'.

In contrast, as illustrated in FIG. 9B, the drivers DRV may be freely arranged regardless of wordlines in the method according to example embodiments. Therefore, a layout pattern representing an arrangement of the drivers DRV may be freely implemented without restriction.

Figure 10A:
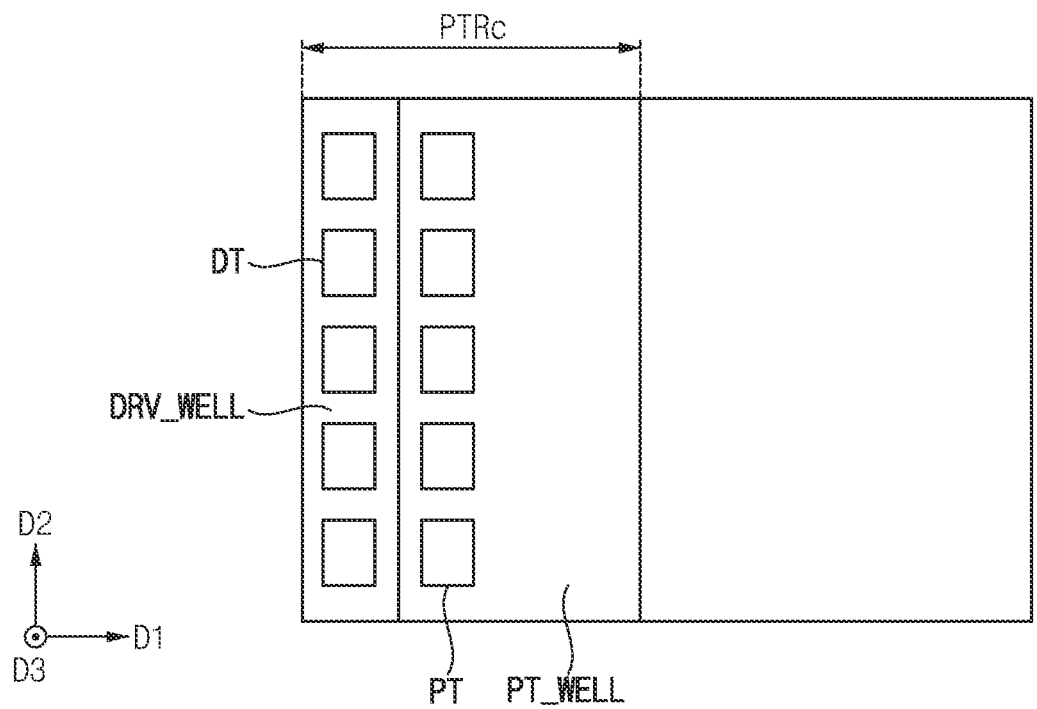
Figure 10B:
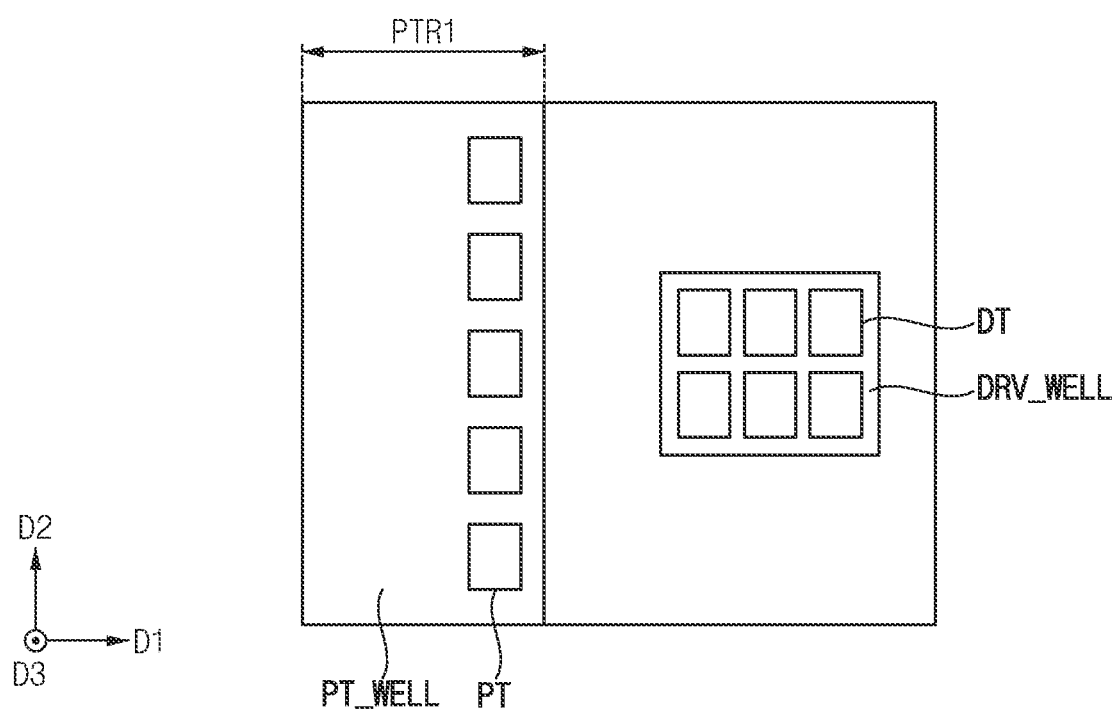

Referring to FIGS. 10A and 10B, FIG. 10A illustrates a related art method where pass transistors PT and drivers DRV are disposed in a first region PTRc, and FIG. 10B illustrates a method according to example embodiments where pass transistors PT are disposed in the first region PTR1 and the drivers DRV are disposed in the second region DR1. In FIGS. 10A and 10B, 'PT_WELL' represents a first well for forming the pass transistors PT, 'DT' represents driving transistors included in the drivers DRV, and 'DRV_WELL' represents a second well for forming the driving transistors DT. For example, the first and second wells PT_WELL and DRV_WELL may be P-wells, and the pass transistors PT and the driving transistors DT may be n-type metal oxide semiconductor (NMOS) transistors.

As illustrated in FIG. 10A, the first and second wells PT_WELL and DRV_WELL are disposed adjacent to each other in the related art method. In other words, the pass transistors PT and the driving transistors DT are disposed to share the wells.

In contrast, as illustrated in FIG. 10B, the first and second wells PT_WELL and DRV_WELL may be disposed independently of each other and may be disposed separately from each other in the method according to example embodiments. In other words, the pass transistors PT and the driving transistors DT may not share the wells, may or may not be independently arranged according to example embodiment, and there may be a region that does not share the wells.

FIGS. 11, 12, 13 and 14 are cross-sectional views of a nonvolatile memory device according to example embodiments.

Figure 11:
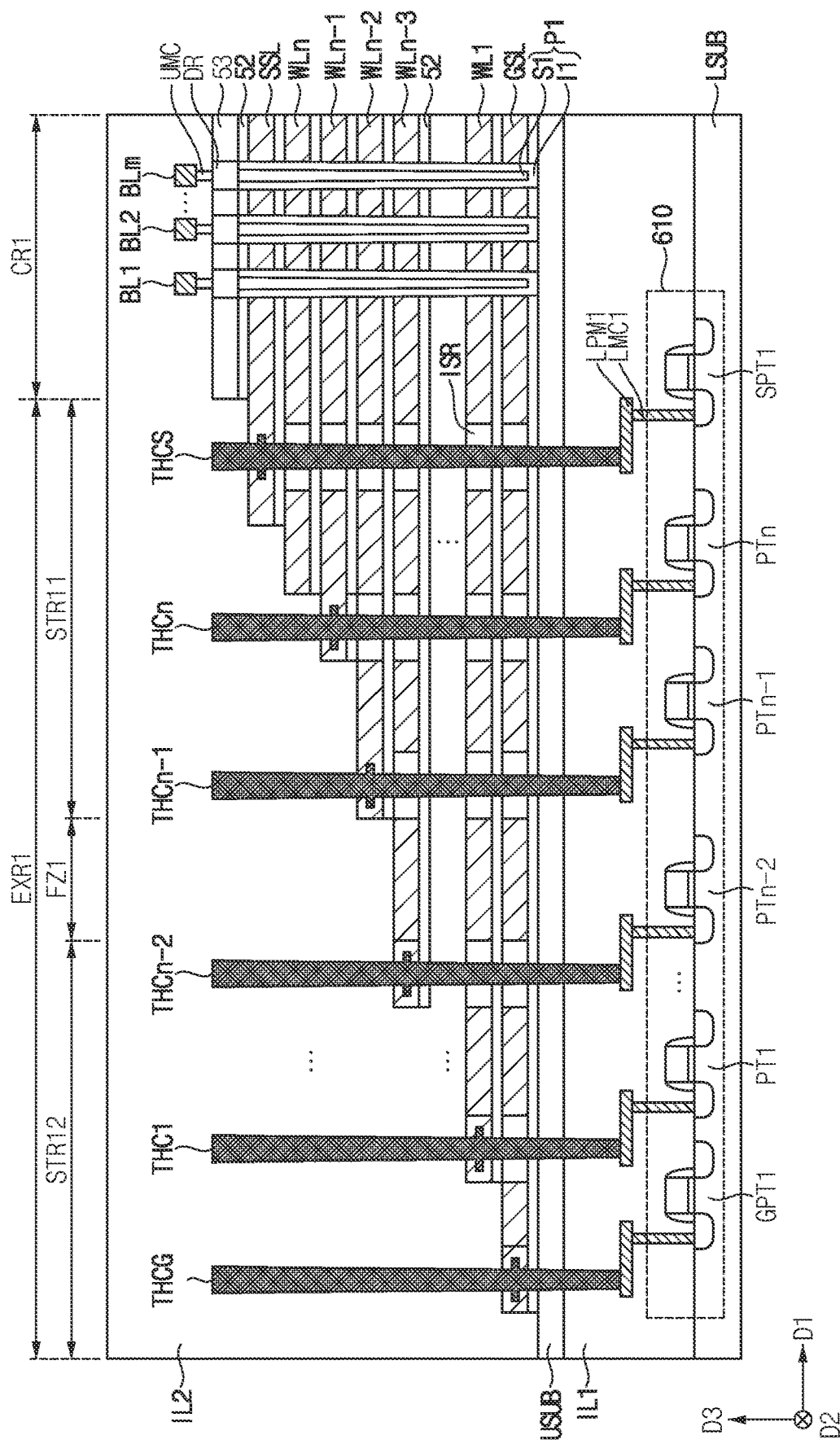
FIGS. 11, 12, 13 and 14 are cross-sectional views of a nonvolatile memory device according to some example embodiments.

Referring to FIGS. 5, 6 and 11, an example where the pass switch circuit 610 and the wordlines WL1 to WLn are connected is illustrated.

The second semiconductor layer L2 may include a lower substrate LSUB and the pass switch circuit 610. The pass switch circuit 610 may be provided (or formed) in the lower substrate LSUB. In some example embodiments, the second semiconductor layer L2 may include lower contacts LMC1 electrically connected to the pass switch circuit 610, lower conductive lines LPM1 electrically connected to the lower contacts LMC1, and a lower insulating layer IL1 covering the lower contacts LMC1 and the lower conductive lines LPM1.

The pass switch circuit 610 may be provided (or formed) in a first portion of the lower substrate LSUB. For example, the pass switch circuit 610 may be provided by forming the string pass transistor SPT1, the wordline pass transistors PT1, . . . , PTn−2, PTn−1, PTn, and the ground pass transistor GPT1 in the first portion of the lower substrate LSUB.

The first semiconductor layer L1 may include the first cell region CR1, and the first extension region EXR1 adjacent to the first side of the first cell region CR1. The first extension region EXR1 may include step regions STR11 and STR12 having a step shape in a cross-sectional view, and a flat zone FZ1 having a flat shape in the cross-sectional view between the step regions STR11 and STR12.

The first semiconductor layer L1 may include an upper substrate USUB, and a vertical structure formed on the upper substrate USUB. The first semiconductor layer L1 may include upper contacts UMC, and bitlines BL1, BL2, . . . , BLm that are electrically connected to the vertical structure. The first semiconductor layer L1 may further include an upper insulating layer IL2 covering the vertical structure and various conductive lines.

The upper substrate USUB may be a support layer that supports gate conductive layers. The upper substrate USUB may be referred to as a base substrate.

The vertical structure may include the gate conductive layers disposed on the upper substrate USUB, and pillars P1 that penetrate or pass through the gate conductive layers and extend in the third direction D3 on a top surface of the upper substrate USUB. The gate conductive layers may include the ground selection line GSL, the plurality of wordlines WL1 to WLn, and the string selection line SSL. The ground selection line GSL, the plurality of wordlines WL1 to WLn, and the string selection line SSL may be sequentially formed on the upper substrate USUB, and insulating interlayers 52 may be disposed under or over each of the gate conductive layers. For example, the conductive layers (e.g., the ground selection line GSL, the wordlines WL1 to WLn, and the string selection line SSL) including a conductive material, and the insulating interlayers 52 including an insulating material, may be alternately stacked in the third direction D3.

Each of the pillars P1 may include a surface layer S1 and inside layer IL For example, the surface layer S1 of the pillars P1 may include a silicon material doped with an impurity, or a silicon material not doped with an impurity.

For example, the ground selection line GSL and a portion of the surface layer S1 disposed adjacent to the ground selection line GSL may form a ground selection transistors (e.g., the ground selection transistor GST in FIG. 4). In addition, the wordlines WL1 to WLn and a portion of the surface layer S1 disposed adjacent to the wordlines WL1 to WLn may form memory cells (e.g., the memory cells MC1 to MC8 in FIG. 4). Further, the string selection line SSL and a portion of the surface layer S1 disposed adjacent to the string selection line SSL may form a string selection transistor (e.g., the string selection transistor SST in FIG. 5).

Drain regions DR may be formed on the pillars P1. The drain regions DR may be electrically connected to the bitlines BL1 to BLm by the upper contacts UMC. For example, the drain regions DR may include a silicon material doped with an impurity. An etch-stop layer 53 may be formed on a side wall of the drain regions DR. A top surface of the etch-stop layer 53 may be formed on the same level as a top surface of the drain regions DR.

The first semiconductor layer L1 may include a plurality of through-hole contacts THCG, THC1, . . . , THCn–2, THCn–1, THCn and THCS penetrating the first step region STR11 and the second step region STR12 and electrically connecting the ground selection line GSL, the plurality of wordlines WL1 to WLn and the string selection line SSL with the ground pass transistor GPT1, the wordline pass transistors PT1 to PTn and the selection pass transistor SPT1, respectively. The plurality of through-hole contacts THCG, THC1 to THCn and THCS may be formed by avoiding the flat zone FZ1.

Because each of the plurality of through-hole contacts THCG, THC1 to THCn and THCS is directly connected to respective lines of the ground selection line GSL, the plurality of wordlines WL1 to WLn, and the string selection line SSL by penetrating conductive lines in the first step region STR11 and the second step region STR12 and the insulating interlayers 52, the upper contacts UMC and upper conductive lines UPM above the first extension region EXR1 may be eliminated or may be used for connecting other elements.

Figure 12:
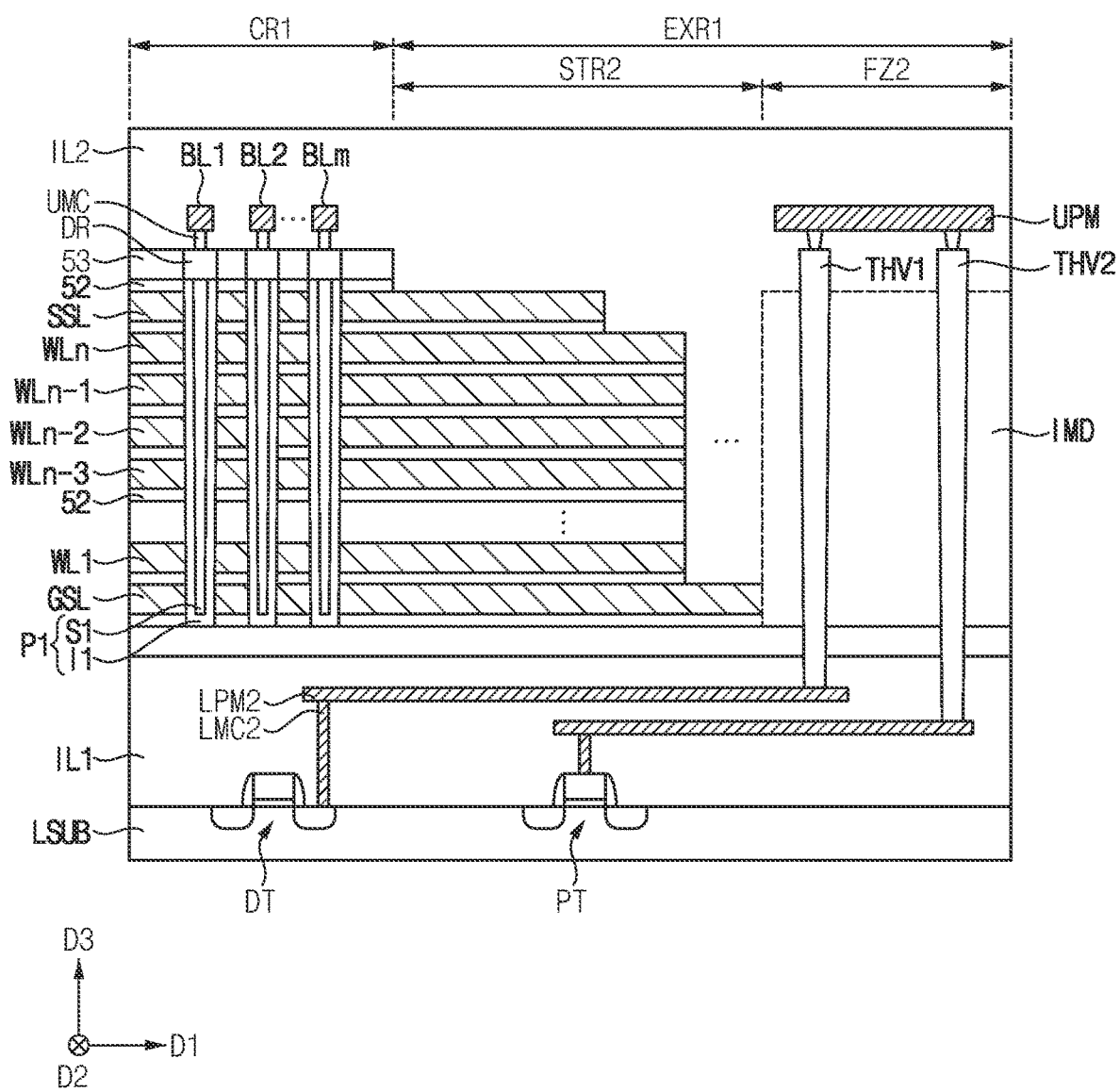

Referring to FIGS. 5, 6 and 12, an example where the pass transistor PT included in the pass switch circuit 610 is connected to the driving transistor DT included in the driver DRV of the driver circuit 620 is illustrated according to example embodiments. The descriptions repeated with FIG. 11 will be omitted for conciseness.

The first extension region EXR1 may include a step region STR2 and a flat zone FZ2. An insulating mold structure IMD may include insulating material that is filled in on the upper substrate USUB in the third direction D3. Through-hole vias THV1 and THV2 may be formed in the flat zone FZ2 and may be formed by penetrating the insulating mold structure IMD. Thus, in some example embodiments, there is no need to further form an insulating material surrounding the through-hole vias THV1 and THV2, which may increase efficiency in the manufacturing process.

In an example of FIG. 12, the transistor PT and the driving transistor DT may be electrically connected to each other by lower contacts LMC2 and lower conductive lines LPM2 in the second semiconductor layer L2, the through-hole vias THV1 and THV2, and the upper conductive lines UPM in the first semiconductor layer L1. In other words, the first pass transistors PTx and the first drivers DRVx may be electrically connected to each other by the through-hole vias THV1 and THV2 and the upper conductive lines UPM above the memory cells MCx. In this example, each of first switching control signals (e.g., the switching control signals SCS in FIG. 5) generated by the first drivers DRVx may be provided to a respective one of the first pass transistors PTx by two or more through-hole vias.

Figure 13:
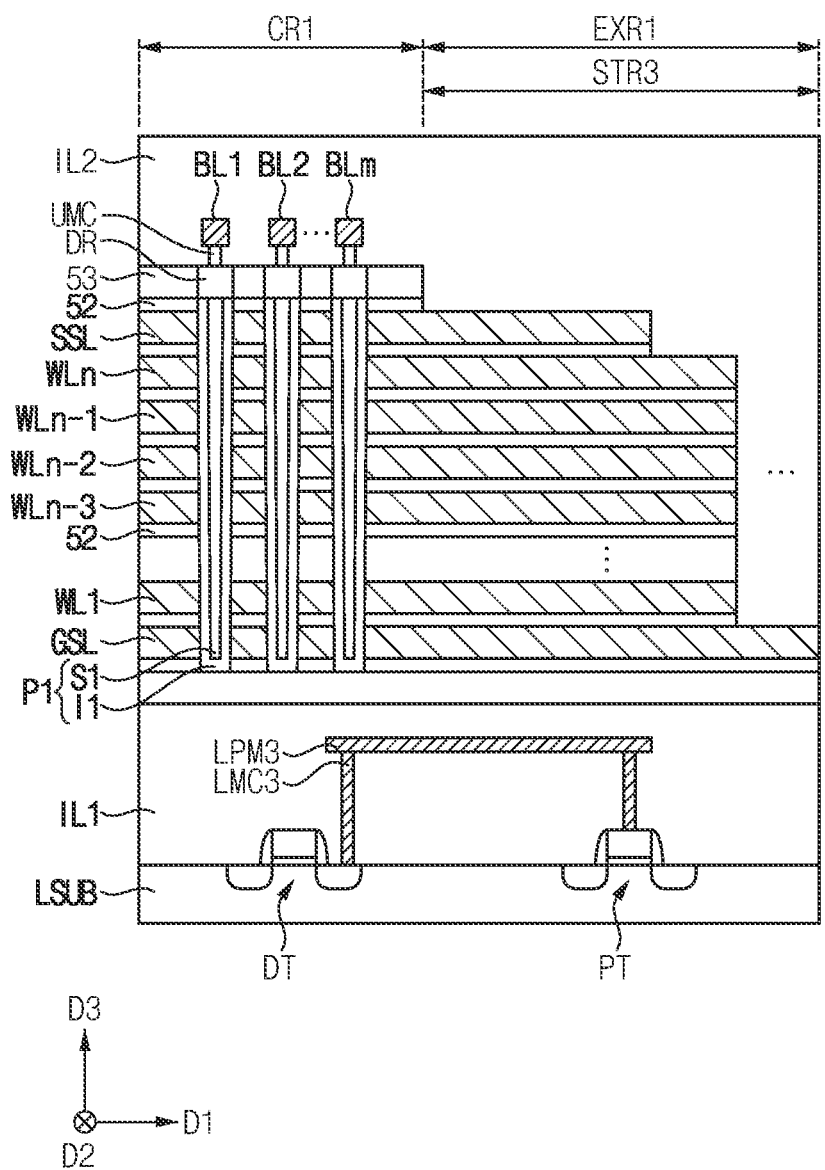

Referring to FIGS. 5, 6 and 13, another example where the pass transistor PT included in the pass switch circuit 610 is connected to the driving transistor DT included in the driver DRV of the driver circuit 620 is illustrated, according to some example embodiments. The descriptions repeated with FIGS. 11 and 12 will be omitted for conciseness. The first extension region EXR1 may include a step region STR3.

In an example of FIG. 13, the pass transistor PT and the driving transistor DT may be electrically connected to each other by lower contacts LMC3 and lower conductive lines LPM3 in the second semiconductor layer L2. In other words, the first pass transistors PTx and the first drivers DRVx may be electrically connected to each other by the lower conductive lines LPM3 under the memory cells MCx. In this example, each of first switching control signals (e.g., the switching control signals SCS in FIG. 5) generated by the first drivers DRVx may be provided to a respective one of the first pass transistors PTx without passing through the through-hole vias.

Figure 14:
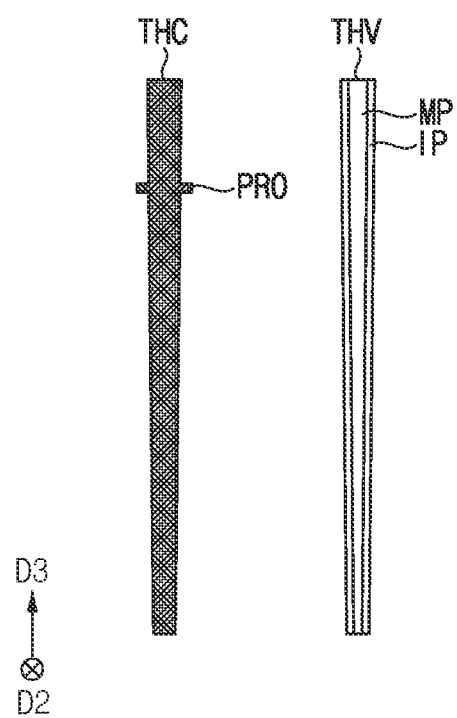

Referring to FIG. 14, a through-hole contact THC and a through-hole via THV may have the same height in the third direction D3, and the through-hole contact THC may have a protruding portion PRO that protrudes in the target line. The through-hole via THV may include an insulating layer pattern IP and a conductive pattern MP.

FIGS. 15A, 15B, 15C, 16A, 16B are perspective views of layout arrangements of components in a nonvolatile memory device according to some example embodiments. The descriptions repeated with FIG. 6 will be omitted for conciseness.

Figure 15A:
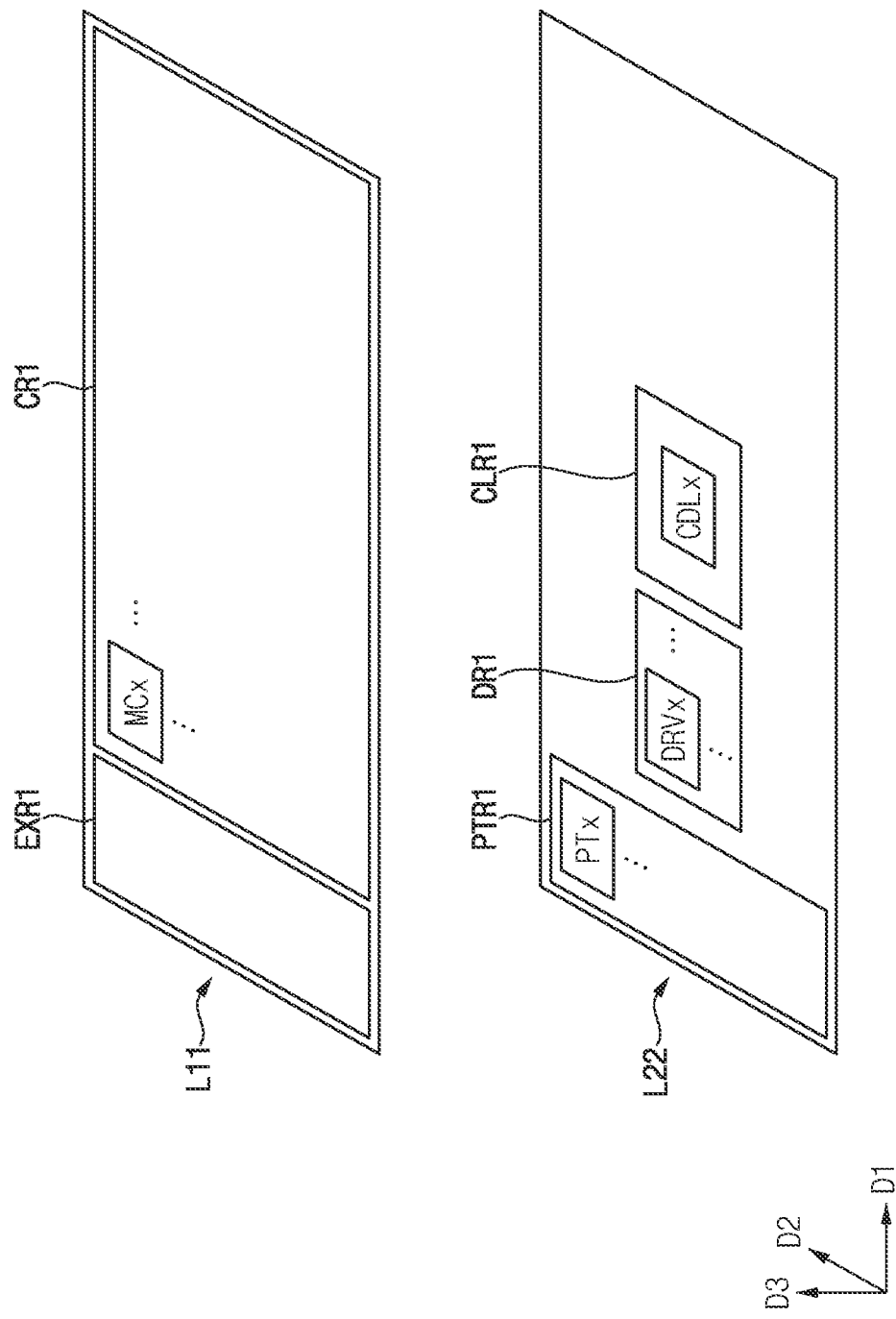
FIGS. 15A, 15B, 15C, 16A, 16B are perspective views of layout arrangements of components in a nonvolatile memory device according to some example embodiments.

Referring to FIG. 15A, the first semiconductor layer L11 may be substantially the same as the first semiconductor layer L11 in FIG. 6.

A second semiconductor layer L22 may correspond to the second semiconductor layer L2 in FIG. 1. The first pass transistors PTx, the first drivers DRVx, and a first coding logic CDLx controlling the first memory block may be formed or included in the second semiconductor layer L22. For example, the first coding logic CDLx may correspond to some of the plurality of coding sub-logics sCDL in FIG. 5.

The first coding logic CDLx may be disposed in a region CLR1 of the second semiconductor layer L21 corresponding to the first cell region CR1. The region CLR1 may be referred to as a coding logic region.

The first coding logic CDLx may generate a first coding signal (e.g., the coding signal CS in FIG. 5), and the first drivers DRVx may generate first switching control signals (e.g., the switching control signals SCS in FIG. 5) based on the first coding signal. In the related art, pass transistors and drivers are disposed in the first region PTR1, and the first coding signal was provided to the drivers through the first region PTR1. However, according to some example embodiments, the first drivers DRVx and the first coding logic CDLx may be disposed in the second region DR1 and the region CLR1 corresponding to the first cell region CR1, and thus the first coding signal may be directly provided from the first coding logic CDLx to the first drivers DRVx without passing through the first region PTR1.

Figure 15B:
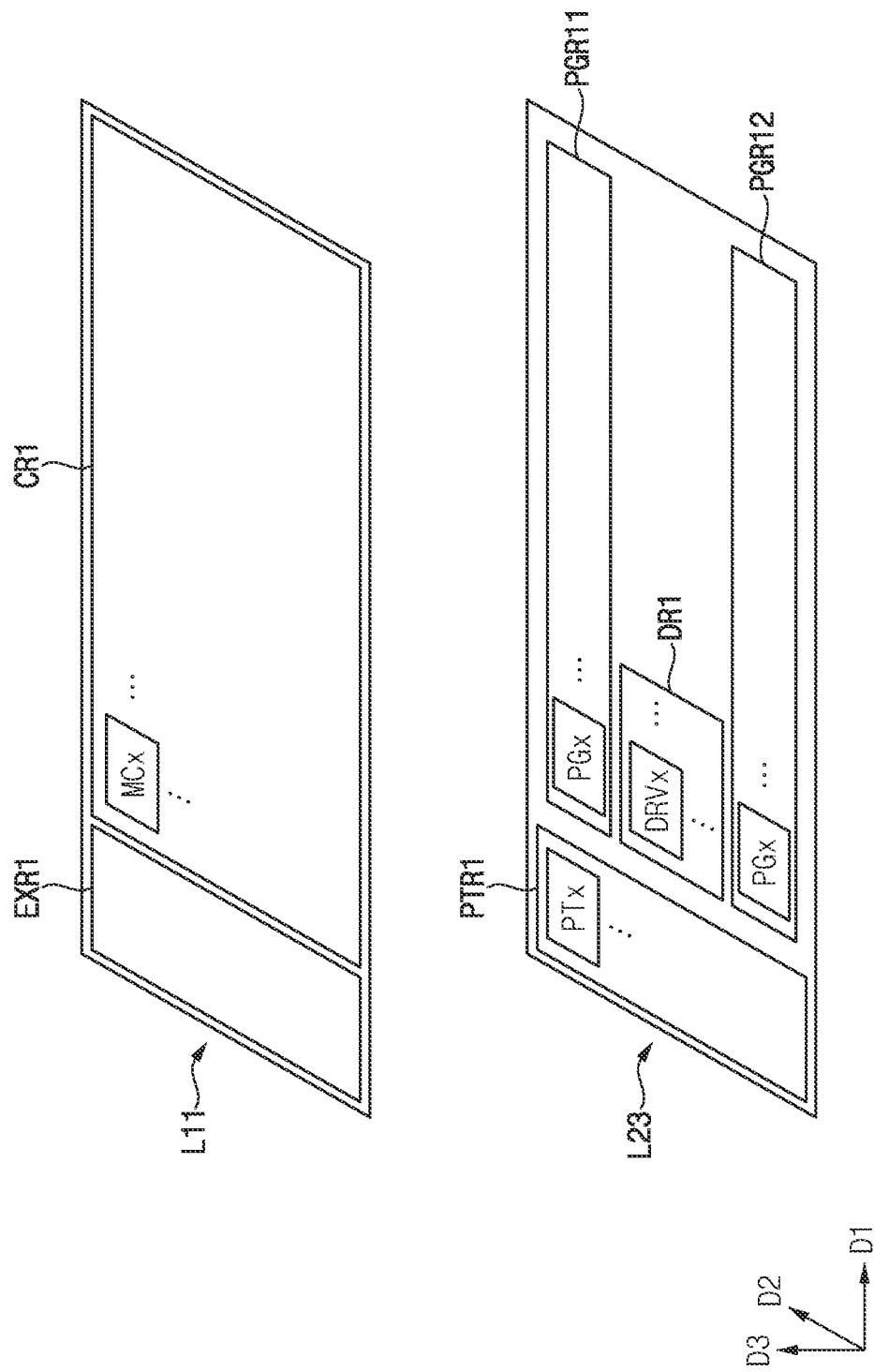

Referring to FIG. 15B, the first semiconductor layer L11 may be substantially the same as the first semiconductor layer L11 in FIG. 6.

A second semiconductor layer L23 may correspond to the second semiconductor layer L2 in FIG. 1. The first pass transistors PTx, the first drivers DRVx, and first page buffers PGx controlling the first memory block may be formed or included in the second semiconductor layer L23. For example, the first page buffers PGx may correspond to some of the plurality of page buffers included in the page buffer circuit 530 of FIG. 2.

The first page buffers PGx may be disposed in regions PGR11 and PGR12 of the second semiconductor layer L21 corresponding to the first cell region CR1. The regions PGR11 and PGR12 may be referred to as page buffer regions. In some example embodiments, one of the regions PGR11 and PGR12 may be omitted.

In some example embodiments, the nonvolatile memory device according to some example embodiments may include both the first coding logic CDLx in FIG. 15A and the first page buffers PGx in FIG. 15B.

Figure 15C:
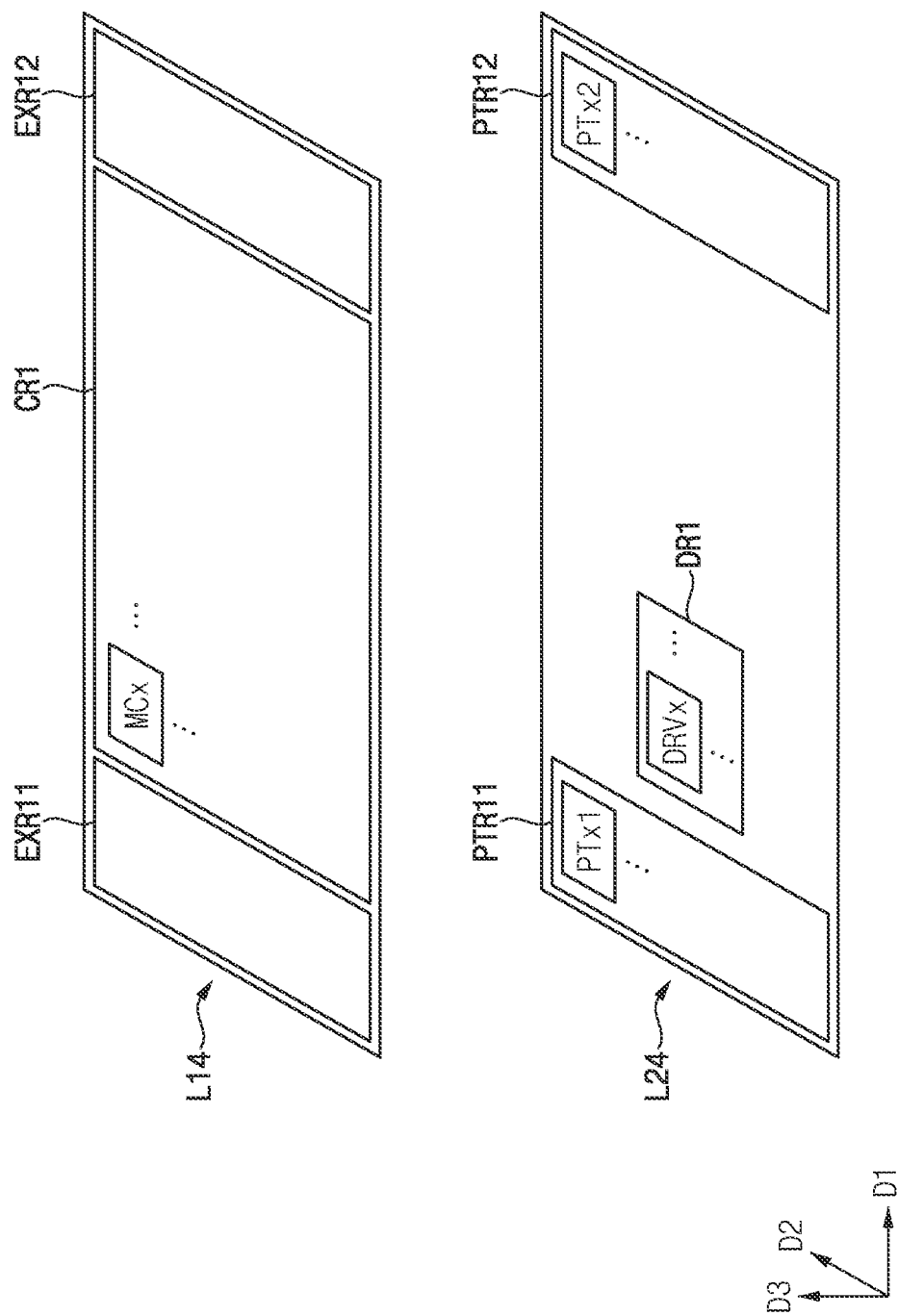

Referring to FIG. 15C, another example of a layout arrangement of the first and second semiconductor layers L1 and L2 in the nonvolatile memory device 10 of FIG. 1 is illustrated.

A first semiconductor layer L14 may correspond to the first semiconductor layer L1 in FIG. 1. The first memory block included in the memory cell array MCA may be formed or included in the first semiconductor layer L14. The first memory block includes the first cell region CR1 including the memory cells MCx, a first extension region EXR11 adjacent to a first side of the first cell region CR1, and a second extension region EXR12 adjacent to a second side of the first cell region CR1 opposite the first side of the first cell region CR1.

A second semiconductor layer L24 may correspond to the second semiconductor layer L2 in FIG. 1. First and second pass transistors PTx1 and PTx2 connected to the first wordlines, and the first drivers DRVx controlling the first and second pass transistors PTx1 and PTx2 may be formed or included in the second semiconductor layer L24. The first pass transistors PTx1 may be disposed in a first region PTR11 of the second semiconductor layer L24 corresponding to the first extension region EXR11, the first drivers DRVx may be disposed in the second region DR1 of the second semiconductor layer L24 corresponding to the first cell region CR1, and the second pass transistors PTx2 may be disposed in a third region PTR12 of the second semiconductor layer L24 corresponding to the second extension region EXR12.

In some example embodiments, as with that described with reference to FIG. 12, the first and second pass transistors PTx1 and PTx2 and the first drivers DRVx may be electrically connected to each other by the through-hole vias THV1 and THV2 and the upper conductive lines UPM above the memory cells MCx. In other example embodiments, as with that described with reference to FIG. 13, the first and second pass transistors PTx1 and PTx2 and the first drivers DRVx may be electrically connected to each other by the lower conductive lines LPM3 under memory cells MCx.

Figure 16A:
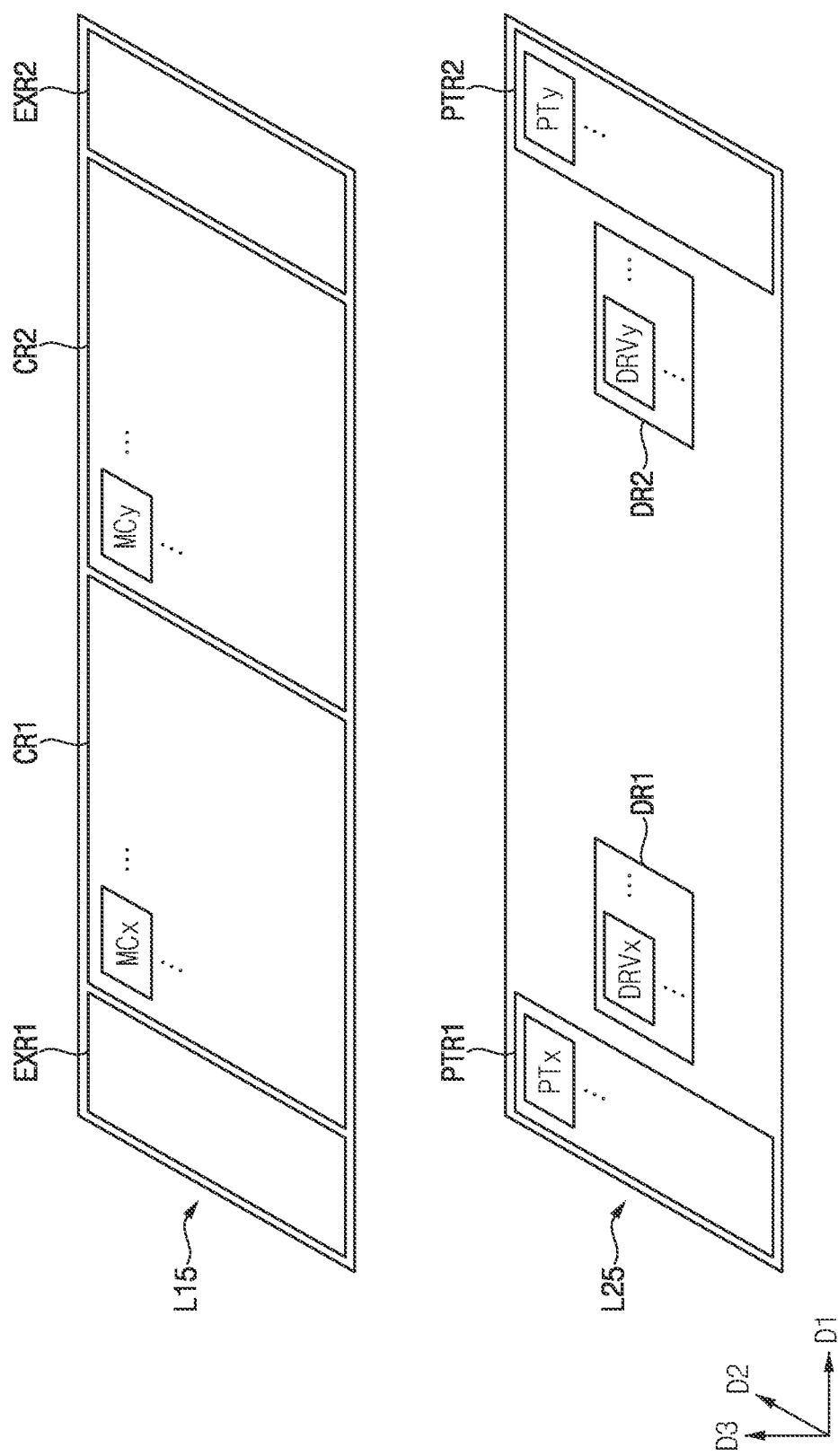

Referring to FIG. 16A, still another example of a layout arrangement of the first and second semiconductor layers L1 and L2 in the nonvolatile memory device 10 of FIG. 1 is illustrated.

A first semiconductor layer L15 may correspond to the first semiconductor layer L1 in FIG. 1. First and second memory blocks that are included in the memory cell array MCA and adjacent to each other in the first direction D1 may be formed or included in the first semiconductor layer L15. A second semiconductor layer L25 may correspond to the second semiconductor layer L2 in FIG. 1. First pass transistors PTx, first drivers DRVx, second pass transistors PTy, and second drivers DRVy may be formed or included in the second semiconductor layer L25. The first memory block, the first pass transistors PTx, and the first drivers DRVx may be substantially the same as those described with reference to FIG. 6.

The second memory block, the second pass transistors PTy, and the second drivers DRVy may be similar to the first memory block, the first pass transistors PTx, and the first drivers DRVx, respectively. The second memory block may include a second cell region CR2 including memory cells MCy, and a second extension region EXR2 adjacent to a first side of the second cell region CR2. The second pass transistors PTy may be connected to second wordlines connected to the second memory block, and may be disposed in a third region PTR2 of the second semiconductor layer L25 corresponding to the second extension region EXR2. The second drivers DRVy may control the second pass transistors PTy, and may be disposed in a fourth region DR2 of the second semiconductor layer L25 corresponding to the second cell region CR2.

Figure 16B:
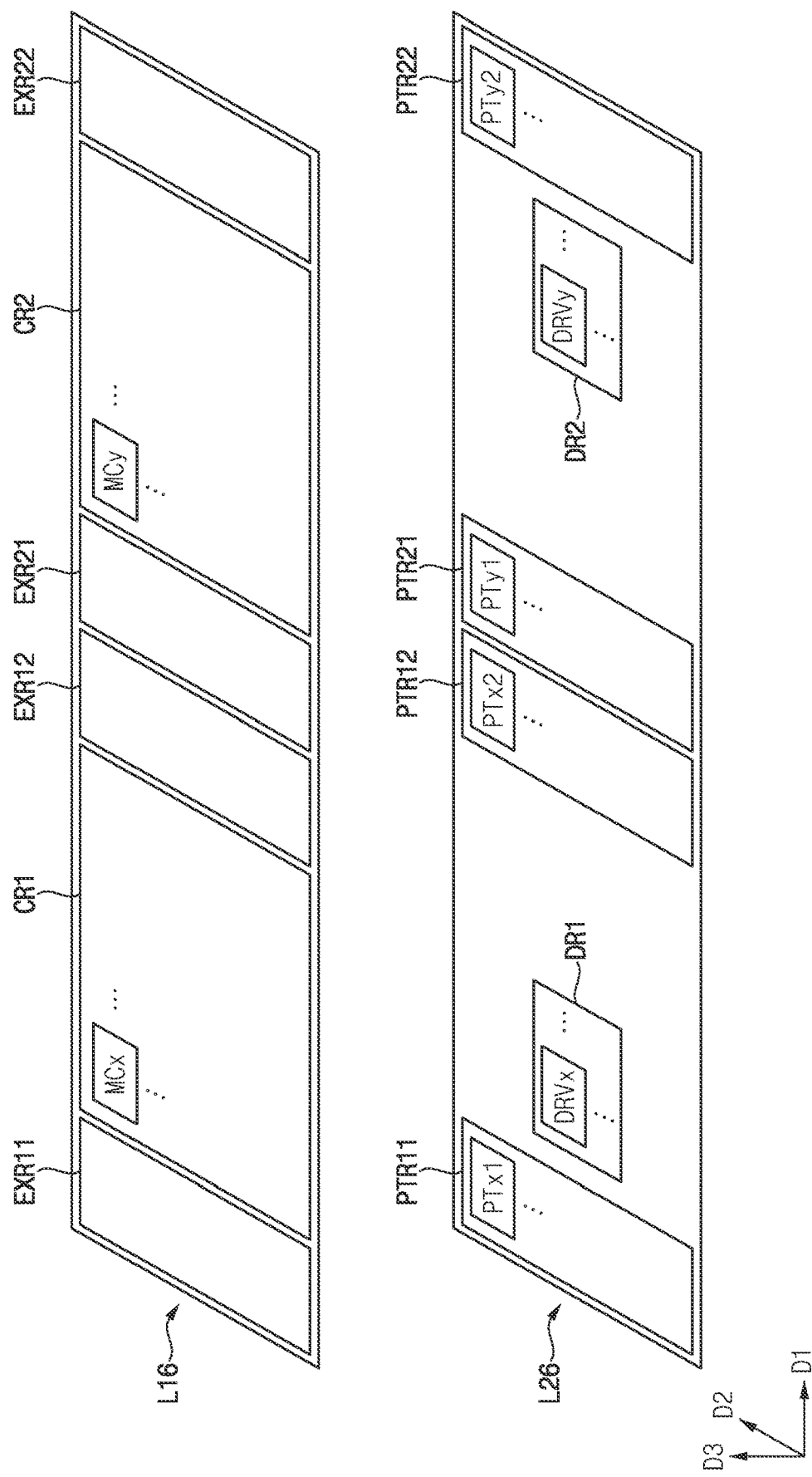

Referring to FIG. 16B, still another example of a layout arrangement of the first and second semiconductor layers L1 and L2 in the nonvolatile memory device 10 of FIG. 1 is illustrated.

A first semiconductor layer L16 may correspond to the first semiconductor layer L1 in FIG. 1. First and second memory blocks that are included in the memory cell array MCA and adjacent to each other in the first direction D1 may be formed or included in the first semiconductor layer L16. A second semiconductor layer L26 may correspond to the second semiconductor layer L2 in FIG. 1. First and second pass transistors PTx1 and PTx2, first drivers DRVx, third and fourth pass transistors PTy1 and PTy2, and second drivers DRVy may be formed or included in the second semiconductor layer L26. The first memory block, the first and second pass transistors PTx1 and PTx2, and the first drivers DRVx may be substantially the same as those described with reference to FIG. 15C.

The second memory block, the third and fourth pass transistors PTy1 and PTy2, and the second drivers DRVy may be similar to the first memory block, the first and second pass transistors PTx1 and PTx2, and the first drivers DRVx, respectively. The second memory block may include a second cell region CR2 including memory cells MCy, a third extension region EXR21 adjacent to a first side of the second cell region CR2, and a fourth extension region EXR22 adjacent to a second side of the second cell region CR2 opposite to the first side of the second cell region CR2. The third pass transistors PTy1 may be connected to second wordlines connected to the second memory block, and may be disposed in a fourth region PTR21 of the second semiconductor layer L26 corresponding to the third extension region EXR21. The second drivers DRVy may control the third and fourth pass transistors PTy1 and PTy2, and may be disposed in a fifth region DR2 of the second semiconductor layer L26 corresponding to the second cell region CR2. The fourth pass transistors PTy2 may be connected to the second wordlines, and may be disposed in a sixth region PTR22 of the second semiconductor layer L26 corresponding to the fourth extension region EXR22.

In some example embodiments, the examples of FIGS. 15C, 16A and 16B may further include at least one of the first coding logic CDLx in FIG. 15A and the first page buffers PGx in FIG. 15B.

FIGS. 17A, 17B, 18A, 18B, 19A and 19B are perspective views of a nonvolatile memory device according to some example embodiments. The descriptions repeated with FIGS. 1 and 6 will be omitted for conciseness.

Figure 17A:
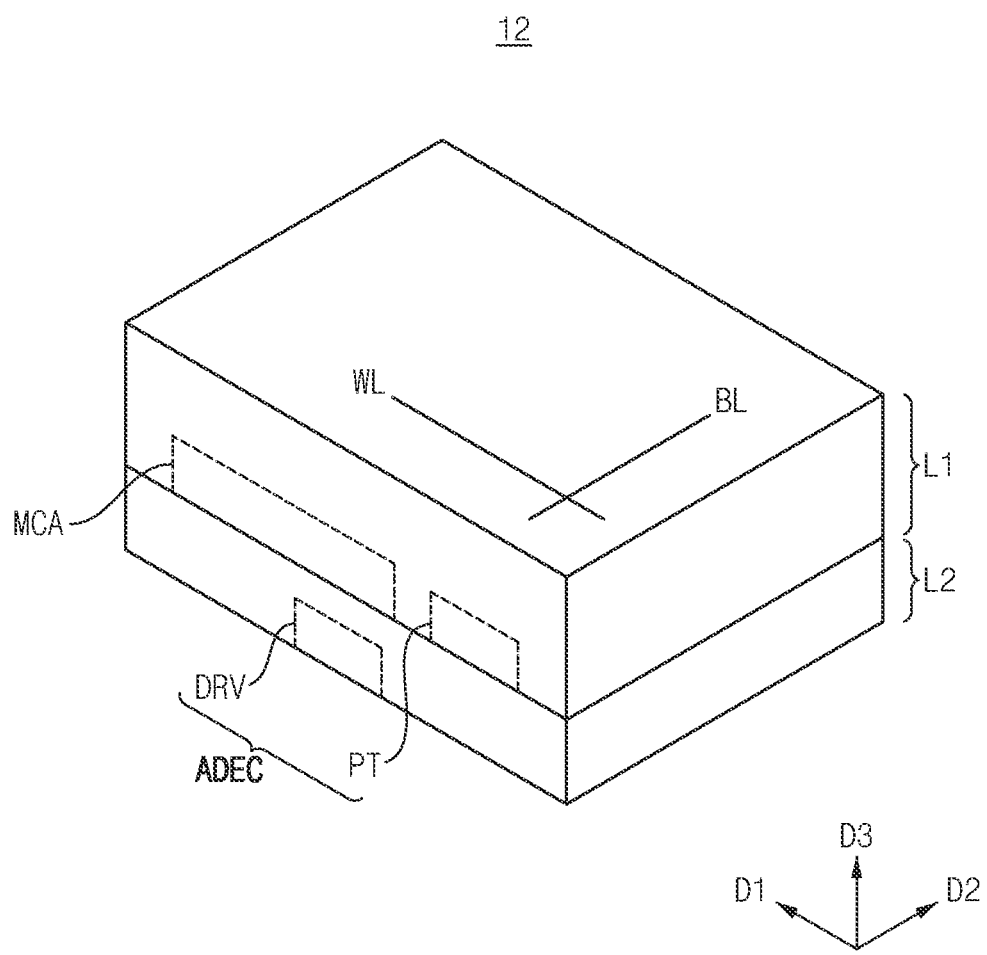
FIGS. 17A, 17B, 18A, 18B, 19A and 19B are perspective views of a nonvolatile memory device according to some example embodiments.

Referring to FIG. 17A, a nonvolatile memory device 12 may be substantially the same as the nonvolatile memory device 10 of FIG. 1, except that the plurality of pass transistors PT are included in the first semiconductor layer L1. Unlike the example of FIG. 1, in an example of FIG. 17A, a portion of the address decoder ADEC may be formed or included in the first semiconductor layer L1, and another part of the address decoder ADEC may be formed or included in the second semiconductor layer L2. For example, the plurality of pass transistors PT may be formed or included in the first semiconductor layer L1.

Figure 17B:
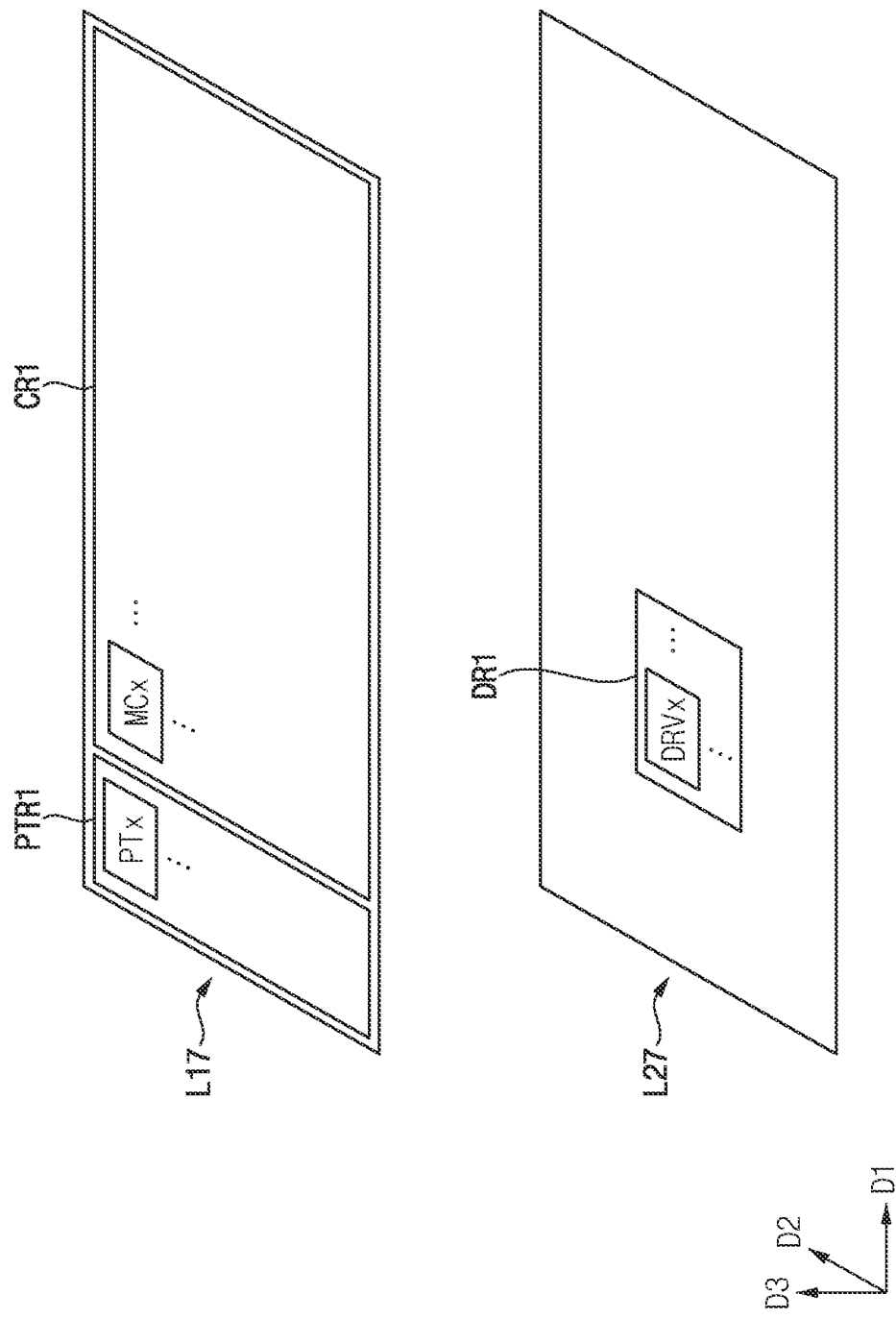

Referring to FIG. 17B, an example of a layout arrangement of the first and second semiconductor layers L1 and L2 in the nonvolatile memory device 12 of FIG. 17A is illustrated.

A first semiconductor layer L17 may correspond to the first semiconductor layer L1 in FIG. 17A. A first memory block included in the memory cell array MCA may be formed or included in the first semiconductor layer L17, and first pass transistors PTx connected to the first wordlines may be formed or included in the first semiconductor layer L17. The first pass transistors PTx may be disposed in a first region PTR1 of the first semiconductor layer L17. For example, the first region PTR1 may correspond to the first extension region EXR1 in FIG. 6. However, example embodiments are not limited thereto, and the first region PTR1 in which the first pass transistors PTx are disposed may correspond to a portion of the first cell region CR1. For example, the first pass transistors PTx may be vertical transistors formed on the first memory block.

A second semiconductor layer L27 may correspond to the second semiconductor layer L2 in FIG. 17A. First drivers DRVx controlling the first pass transistors PTx may be formed or included in the second semiconductor layer L27. The first drivers DRVx may be disposed in a second region DR1 of the second semiconductor layer L27. For example, the second region DR1 may correspond to the first cell region CR1. However, example embodiments are not limited thereto, and the second region DR1 in which the first drivers DRVx are disposed may correspond to the first region PTR1 (e.g., the first extension region EXR1).

Figure 18A:
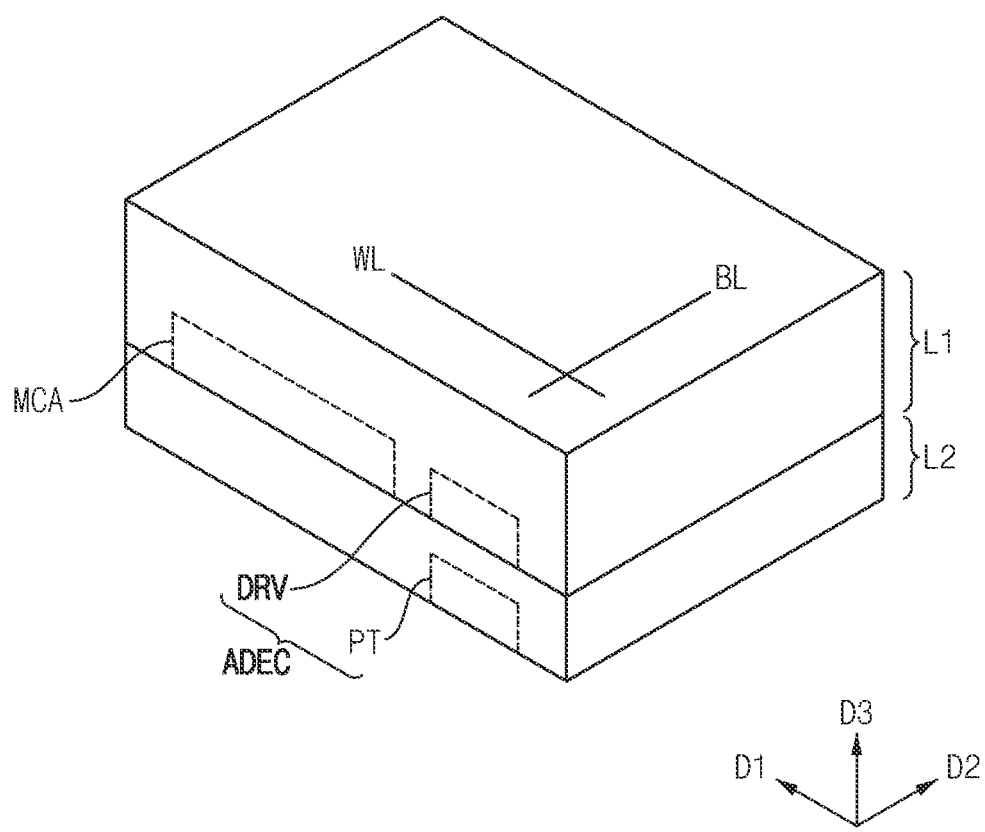

Referring to FIG. 18A, a nonvolatile memory device 14 may be substantially the same as the nonvolatile memory device 10 of FIG. 1, except that the plurality of drivers DRV are included in the first semiconductor layer L1. Unlike the example of FIG. 1, in an example of FIG. 18A, a portion of the address decoder ADEC may be formed or included in the first semiconductor layer L1, and another part of the address decoder ADEC may be formed or included in the second semiconductor layer L2. For example, the plurality of drivers DRV may be formed or included in the first semiconductor layer L1.

Figure 18B:
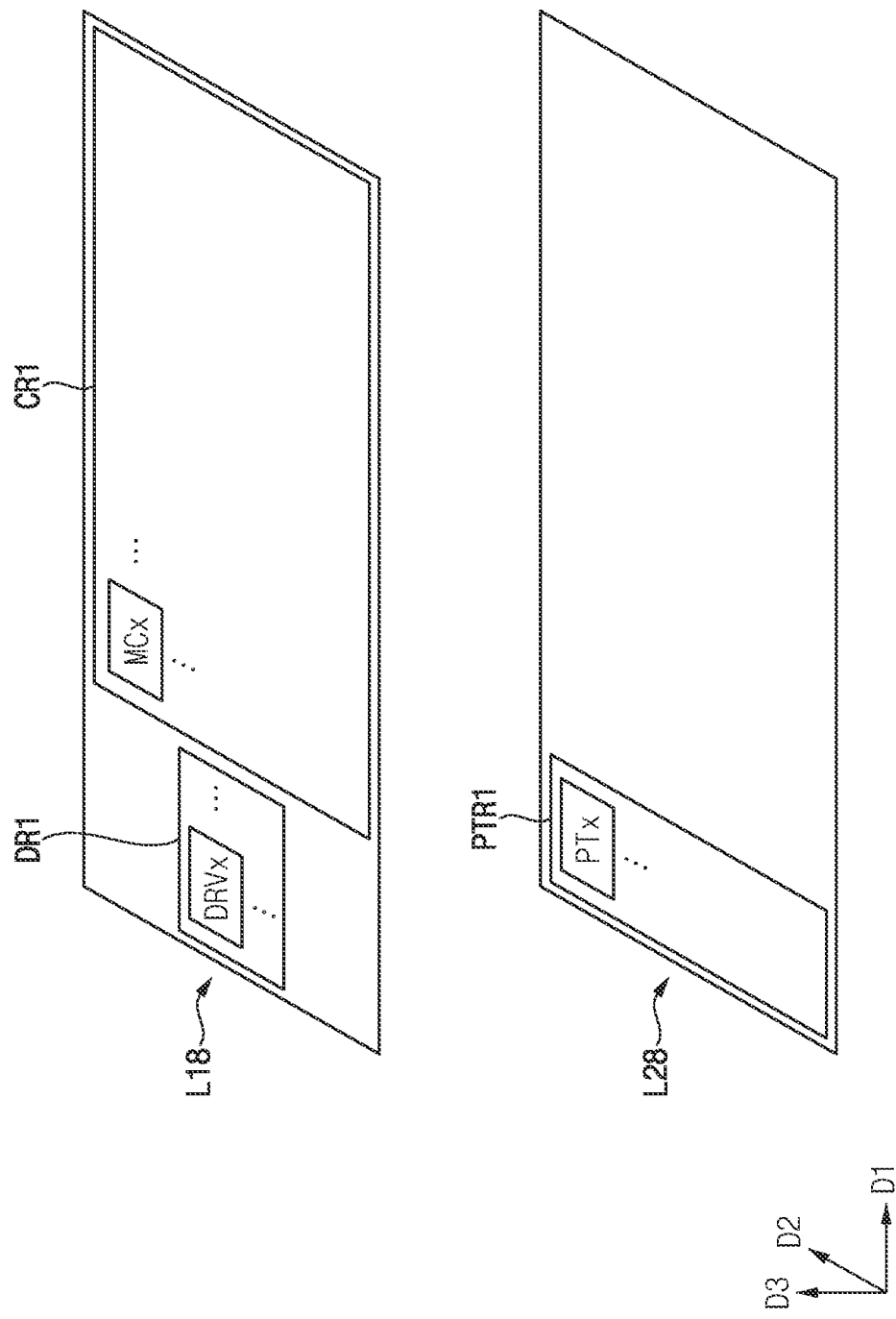

Referring to FIG. 18B, an example of a layout arrangement of the first and second semiconductor layers L1 and L2 in the nonvolatile memory device 14 of FIG. 18A is illustrated.

A first semiconductor layer L18 may correspond to the first semiconductor layer L1 in FIG. 18A. A first memory block included in the memory cell array MCA may be formed or included in the first semiconductor layer L18.

A second semiconductor layer L28 may correspond to the second semiconductor layer L2 in FIG. 18A. First pass transistors PTx connected to the first wordlines may be formed or included in the second semiconductor layer L28. The first pass transistors PTx may be disposed in a first region PTR1 of the second semiconductor layer L28. For example, the first region PTR1 may correspond to the first extension region EXR1 in FIG. 6. However, example embodiments are not limited thereto, and the first region PTR1 in which the first pass transistors PTx are disposed may correspond to a portion of the first cell region CR1.

First drivers DRVx controlling the first pass transistors PTx may be formed or included in the first semiconductor layer L18. The first drivers DRVx may be disposed in a second region DR1 of the first semiconductor layer L18. For example, the second region DR1 may correspond to a portion of the first extension region EXR1 in FIG. 6. However, example embodiments are not limited thereto, and the second region DR1 in which the first drivers DRVx are disposed may correspond to a portion of the first cell region CR1.

Figure 19A:
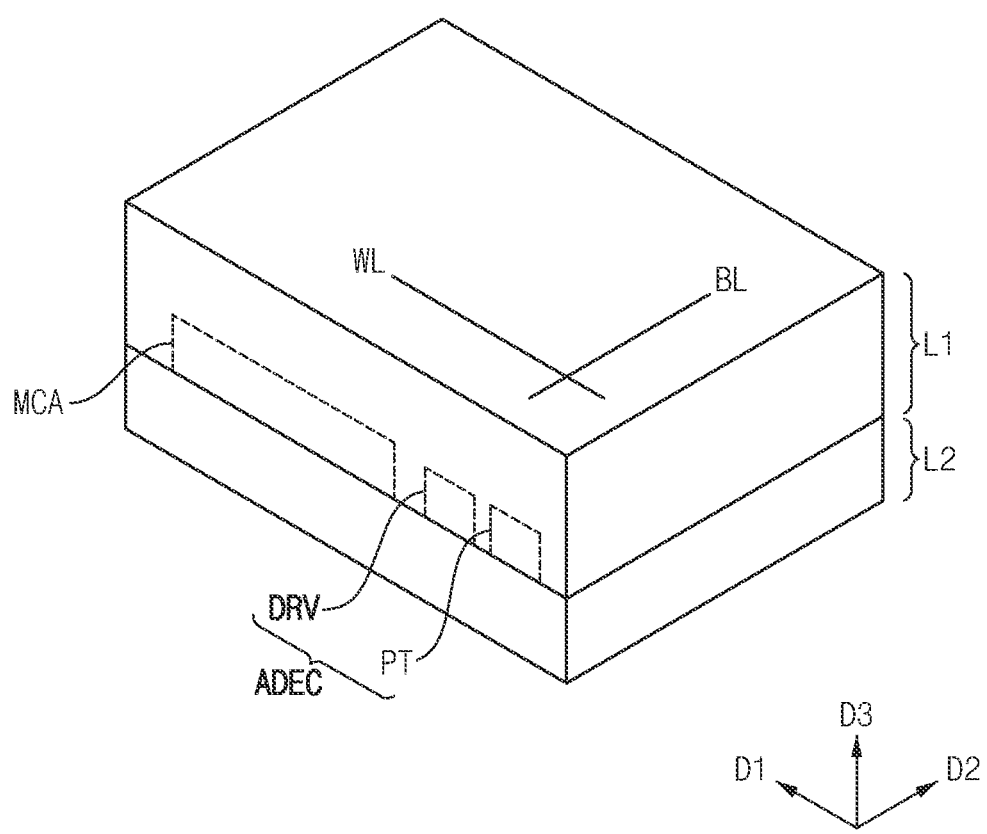

Referring to FIG. 19A, a nonvolatile memory device 16 may be substantially the same as the nonvolatile memory device 10 of FIG. 1, except that the plurality of pass transistors PT and the plurality of drivers DRV are included in the first semiconductor layer L1. Unlike the example of FIG. 1, in an example of FIG. 19A, all of the address decoder ADEC (e.g., both the plurality of pass transistors PT and the plurality of drivers DRV) may be formed or included in the first semiconductor layer L1.

Figure 19B:
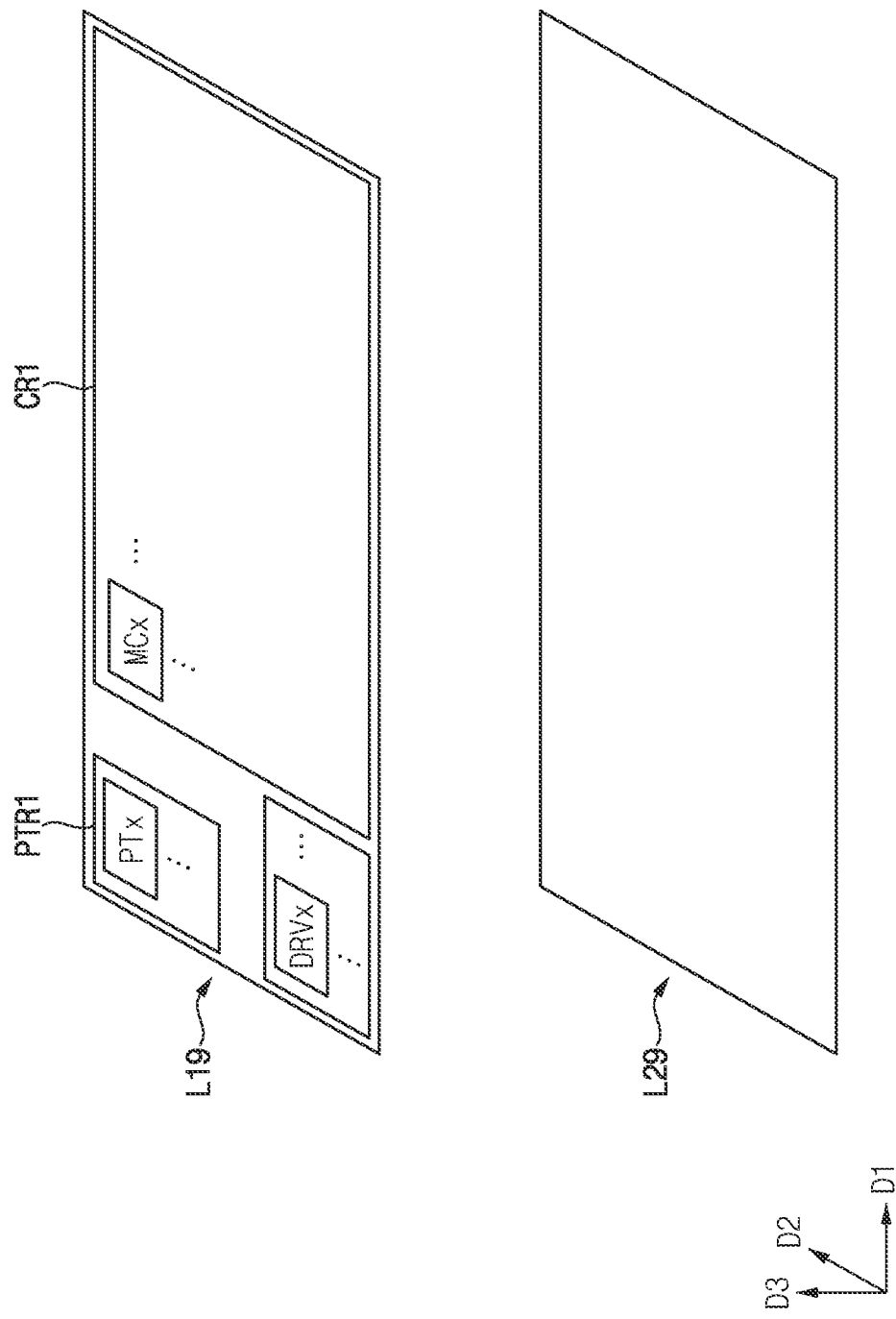

Referring to FIG. 19B, an example of a layout arrangement of the first and second semiconductor layers L1 and L2 in the nonvolatile memory device 16 of FIG. 19A is illustrated.

A first semiconductor layer L19 may correspond to the first semiconductor layer L1 in FIG. 19A. A first memory block included in the memory cell array MCA may be formed or included in the first semiconductor layer L19, first pass transistors PTx connected to the first wordlines may be formed or included in the first semiconductor layer L19, and first drivers DRVx controlling the first pass transistors PTx may be formed or included in the first semiconductor layer L19. The first pass transistors PTx may be disposed in a first region PTR1 of the first semiconductor layer L19, and the first drivers DRVx may be disposed in a second region DR1 of the first semiconductor layer L19. For example, each of the first region PTR1 and the second region DR1 may correspond to a portion of the first extension region EXR1 in FIG. 6. However, example embodiments are not limited thereto, and at least a portion of the first region PTR1 and the second region DR1 may correspond to a portion of the first cell region CR1. A second semiconductor layer L29 may correspond to the second semiconductor layer L2 in FIG. 19A.

Layout arrangements of the first pass transistors PTx and the first drivers DRVx in FIGS. 17B, 18B and 19B may be substantially the same as those described with reference to FIGS. 8, 9 and 10. Although not illustrated in detail, at least a portion of the peripheral circuit may be further formed or included in the second semiconductor layers L27, L28 and L29 in FIGS. 17B, 18B, and 19B.

In some example embodiments, the examples of FIGS. 17B, 18B and 19B may further include at least one of the first coding logic CDLx in FIG. 15A and the first page buffers PGx in FIG. 15B. In some example embodiments, the examples of FIGS. 17B, 18B and 19B may include both the first and second pass transistors PTx1 and PTx2 as illustrated in FIG. 15C. In some example embodiments, the examples of FIGS. 17B, 18B and 19B may further include the second memory block as illustrated in FIGS. 16A and 16B.

Figure 20:
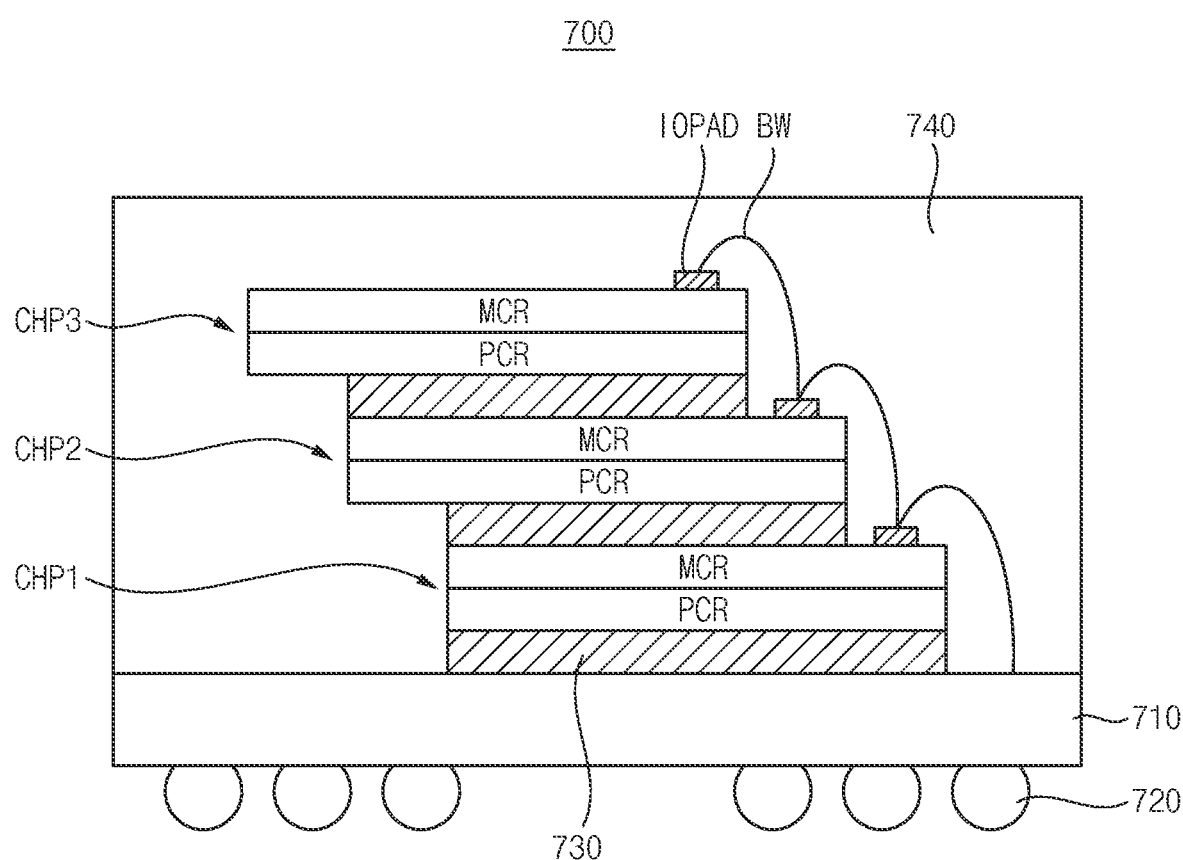
FIG. 20 is a cross-sectional view of a memory package according to some example embodiments.

FIG. 20 is a cross-sectional view of a memory package according to some example embodiments.

Referring to FIG. 20, a memory package 700 includes a base substrate 710 and a plurality of memory chips CHP1, CHP2 and CHP3 stacked on the base substrate 710.

Each of the memory chips CHP1, CHP2 and CHP3 may include a peripheral circuit region PCR and a memory cell region MCR, and may further include a plurality of I/O pads IOPAD. The peripheral circuit region PCR and the memory cell region MCR in FIG. 20 may correspond to the second semiconductor layer L2 and the first semiconductor layer L1 described with reference to FIG. 1, respectively, and further may include said elements described herein to be included in the second semiconductor layer L2 and the first semiconductor layer L1, respectively, according to any of the example embodiments described herein. For example, the memory cell region MCR may include the upper substrate USUB and the memory cell array MCA thereon and including memory blocks extending along the second direction D2, and the peripheral circuit region PCR may include the lower substrate LSUB and the address decoder ADEC configured to control the memory cell array, where the memory blocks may have a same structure according to any of the example embodiments of memory blocks. The plurality of I/O pads IOPAD may be formed on the memory cell region MCR. The plurality of memory chips CHP1, CHP2 and CHP3 may include the nonvolatile memory device according to example embodiments.

In some example embodiments, the plurality of memory chips CHP1, CHP2 and CHP3 may be stacked on the base substrate 710 such that a surface on which the plurality of I/O pads IOPAD are formed faces upwards. In some example embodiments, the plurality of memory chips CHP1, CHP2 and CHP3 may be stacked in a downside-down state such that a second surface (e.g., a bottom surface) of the semiconductor substrate of each memory chip faces downwards. In other words, with respect to each of the plurality of memory chips CHP1, CHP2 and CHP3, the memory cell region MCR may be located on the peripheral circuit region PCR.

In some example embodiments, with respect to each of the plurality of memory chips CHP1, CHP2 and CHP3, the plurality of I/O pads IOPAD may be arranged near one side of the semiconductor substrate. As such, the plurality of memory chips CHP1, CHP2 and CHP3 may be stacked scalariformly, that is, in a step shape, such that the plurality of I/O pads IOPAD of each memory chip may be exposed. In such stacked state, the plurality of memory chips CHP1, CHP2 and CHP3 may be electrically connected to the base substrate 710 through a plurality of bonding wires BW.

The plurality of stacked memory chips CHP1, CHP2 and CHP3 and the plurality of bonding wires BW may be fixed by a sealing member 740, and adhesive members 730 may intervene between the base substrate 710 and the plurality of memory chips CHP1, CHP2 and CHP3. Conductive bumps 720 may be formed on a bottom surface of the base substrate 710 for electrical connections to the external device.

Figure 21:
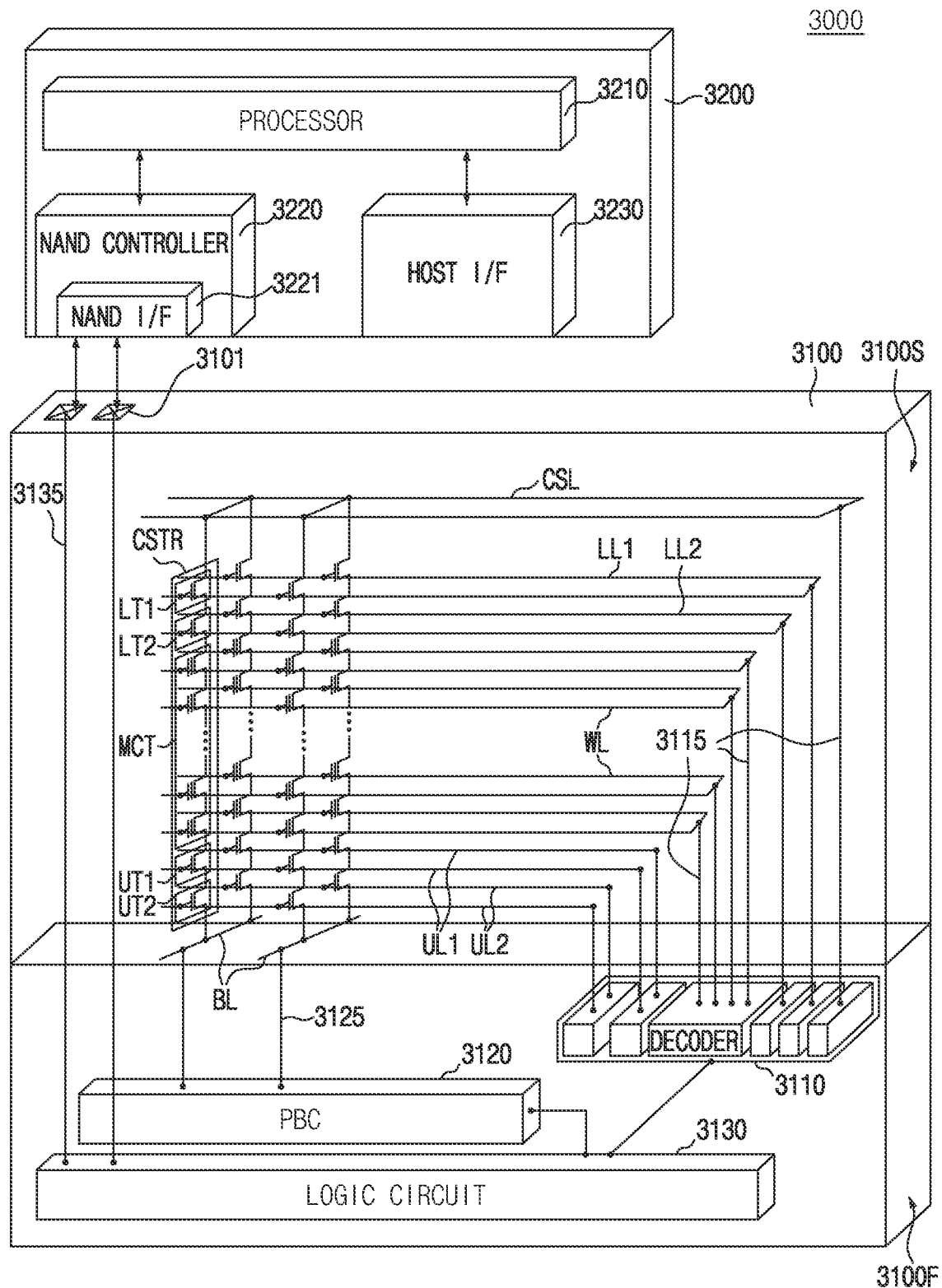
FIG. 21 is a block diagram illustrating an electronic system including a nonvolatile memory device according to some example embodiments.

FIG. 21 is a block diagram illustrating an electronic system including a nonvolatile memory device according to some example embodiments.

Referring to FIG. 21, an electronic system 3000 may include a semiconductor device 3100 and a controller 3200 electrically connected to the semiconductor device 3100. The electronic system 3000 may be a storage device including one or a plurality of semiconductor devices 3100 or an electronic device including the storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a nonvolatile memory device, for example, the nonvolatile memory device according to example embodiments described with reference to FIGS. 1 through 19B. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including bitlines BL, a common source line CSL, wordlines WL, first and second upper gate lines UL1 and UL2, first and second lower gate lines LL1 and LL2, and memory cell strings CSTR between the bitlines BL and the common source line CSL.

In the second structure 3100S, each of the memory cell strings CSTR may include lower transistors LT1 and LT2 adjacent to the common source line CSL, upper transistors UT1 and UT2 adjacent to the bitlines BL, and a plurality of memory cell transistors MCT between the lower transistors LT1 and LT2 and the upper transistors UT1 and UT2.

In the first structure 3100F, the decoder circuit 3110, the page buffer circuit 3120, and the logic circuit 3130 may correspond to the address decoder 520, the page buffer circuit 530, and the control circuit 560 in FIG. 2, respectively.

The common source line CSL, the first and second lower gate lines LL1 and LL2, the wordlines WL, and the first and second upper gate lines UL1 and UL2 may be electrically connected to the decoder circuit 3110 through first connection wirings 3115 extending to the second structure 3110S in the first structure 3100F. The bitlines BL may be electrically connected to the page buffer circuit 3120 through second connection wirings 3125 extending to the second structure 3100S in the first structure 3100F. The I/O pad 3101 may be electrically connected to the logic circuit 3130 through an I/O connection wiring 3135 extending to the second structure 3100S in the first structure 3100F.

The controller 3200 may include a processor 3210, a NAND controller 3220 and a host interface 3230. In some example embodiments, the electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

Figure 22:
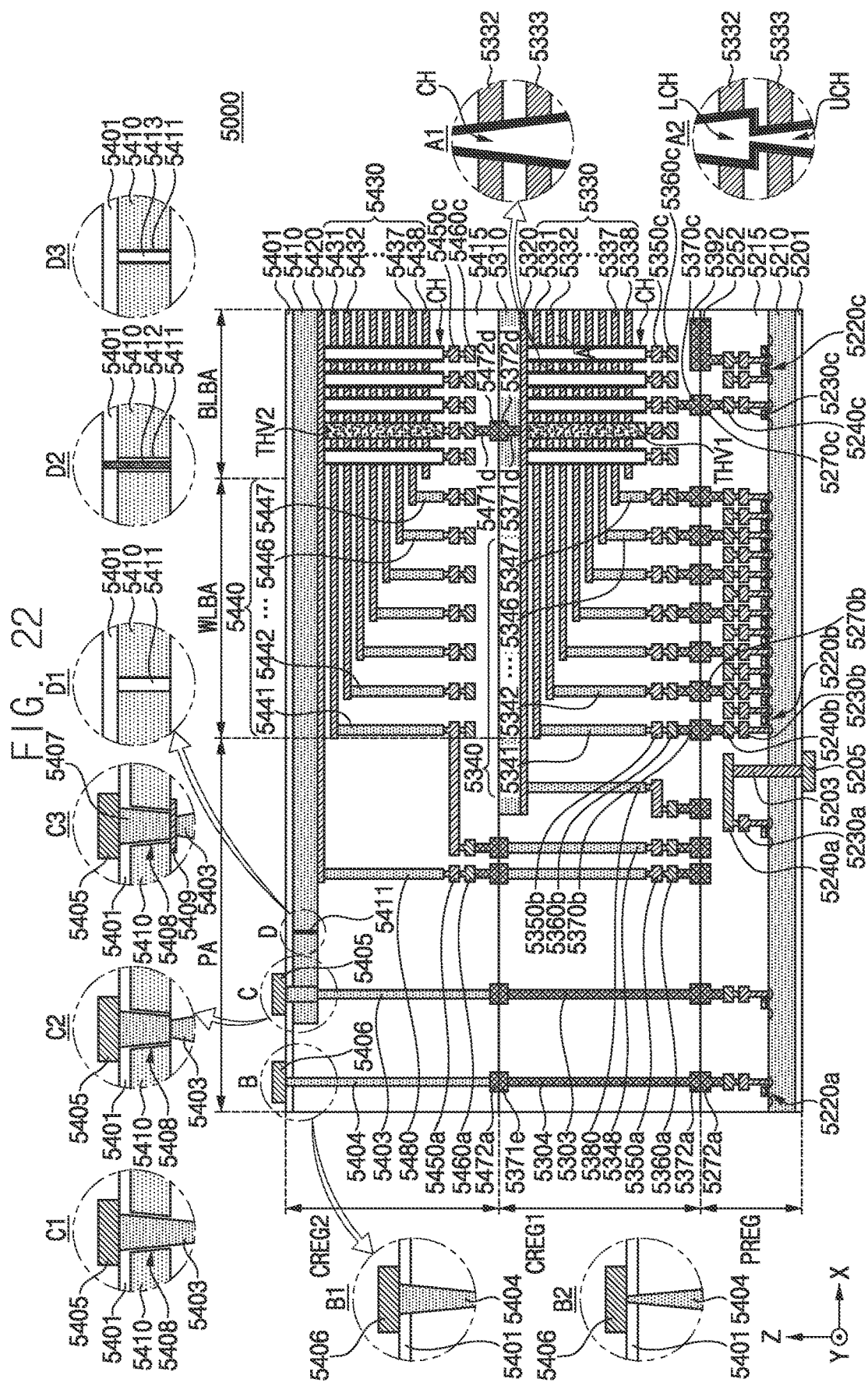
FIG. 22 is a cross-sectional view of a memory device according to some example embodiments.

FIG. 22 is a cross-sectional view of a memory device according to some example embodiments.

Referring to FIG. 22, a memory device (or nonvolatile memory device) 5000 may have a chip-to-chip (C2C) structure. At least one upper chip including a cell region and a lower chip including a peripheral circuit region PREG may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 5000 may include the at least one upper chip including the cell region. For example, as illustrated in FIG. 22, the memory device 5000 may include two upper chips. However, the number of the upper chips is not limited thereto. In the case in which the memory device 5000 includes the two upper chips, a first upper chip including a first cell region CREG1, a second upper chip including a second cell region CREG2 and the lower chip including the peripheral circuit region PREG may be manufactured separately, and then, the first upper chip, the second upper chip and the lower chip may be connected to each other by the bonding method to manufacture the memory device 5000. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 22. However, embodiments are not limited thereto. In some example embodiments, one of the first upper chip and the second upper chip may be turned over and then may be connected to a corresponding chip by the bonding method.

Each of the peripheral circuit region PREG and the first and second cell regions CREG1 and CREG2 of the memory device 5000 may include an external pad bonding region PA, a wordline bonding region WLBA, and a bitline bonding region BLBA.

The peripheral circuit region PREG may include a first substrate 5210 and a plurality of circuit elements 5220*a*, 5220*b* and 5220*c* formed on the first substrate 5210. An interlayer insulating layer 5215 including one or more insulating layers may be provided on the plurality of circuit elements 5220*a*, 5220*b* and 5220*c*, and a plurality of metal lines electrically connected to the plurality of circuit elements 5220*a*, 5220*b* and 5220*c* may be provided in the interlayer insulating layer 5215. For example, the plurality of metal lines may include first metal lines 5230*a*, 5230*b* and 5230*c* connected to the plurality of circuit elements 5220*a*, 5220*b* and 5220*c*, and second metal lines 5240*a*, 5240*b* and 5240*c* formed on the first metal lines 5230*a*, 5230*b* and 5230*c*. The plurality of metal lines may be formed of at least one of various conductive materials. For example, the first metal lines 5230*a*, 5230*b* and 5230*c* may be formed of tungsten having a relatively high electrical resistivity, and the second metal lines 5240*a*, 5240*b* and 5240*c* may be formed of copper having a relatively low electrical resistivity.

The first metal lines 5230*a*, 5230*b* and 5230*c* and the second metal lines 5240*a*, 5240*b* and 5240*c* are illustrated and described in some example embodiments. However, embodiments are not limited thereto. In some example embodiments, at least one or more additional metal lines may further be formed on the second metal lines 5240*a*, 5240*b* and 5240*c*. In this case, the second metal lines 5240*a*, 5240*b* and 5240*c* may be formed of aluminum, and at least some of the additional metal lines formed on the second metal lines 5240*a*, 5240*b* and 5240*c* may be formed of copper having an electrical resistivity lower than that of aluminum of the second metal lines 5240*a*, 5240*b* and 5240*c*.

The interlayer insulating layer 5215 may be disposed on the first substrate 5210 and may include an insulating material such as silicon oxide and/or silicon nitride.

Each of the first and second cell regions CREG1 and CREG2 may include at least one memory block. The first cell region CREG1 may include a second substrate 5310 and a common source line 5320. A plurality of wordlines 5330 (5331 to 5338) may be stacked on the second substrate 5310 in a direction (i.e., the Z-axis direction) perpendicular to a top surface of the second substrate 5310. String selection lines and a ground selection line may be disposed on and under the wordlines 5330, and the plurality of wordlines 5330 may be disposed between the string selection lines and the ground selection line. Likewise, the second cell region CREG2 may include a third substrate 5410 and a common source line 5420, and a plurality of wordlines 5430 (5431 to 5438) may be stacked on the third substrate 5410 in a direction (i.e., the Z-axis direction) perpendicular to a top surface of the third substrate 5410. Each of the second substrate 5310 and the third substrate 5410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CREG1 and CREG2.

In some example embodiments, as illustrated in a region 'A1', the channel structure CH may be provided in the bitline bonding region BLBA and may extend in the direction perpendicular to the top surface of the second substrate 5310 to penetrate the wordlines 5330, the string selection lines, and the ground selection line. The channel structure CH may include a data storage layer, a channel layer, and a filling insulation layer. The channel layer may be electrically connected to a first metal line 5350*c* and a second metal line 5360*c* in the bitline bonding region BLBA. For example, the second metal line 5360*c* may be a bitline and may be connected to the channel structure CH through the first metal line 5350*c*. The bitline 5360*c* may extend in a first direction (e.g., a Y-axis direction) parallel to the top surface of the second substrate 5310.

In some example embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 5310 to penetrate the common source line 5320 and lower wordlines 5331 and 5332. The lower channel LCH may include a data storage layer, a channel layer, and a filling insulation layer and may be connected to the upper channel UCH. The upper channel UCH may penetrate upper wordlines 5333 to 5338. The upper channel UCH may include a data storage layer, a channel layer, and a filling insulation layer, and the channel layer of the upper channel UCH may be electrically connected to the first metal line 5350c and the second metal line 5360c. As a length of a channel increases, due to characteristics of manufacturing processes, it may be difficult to form a channel having a substantially uniform width. The memory device 5000 according to some example embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a wordline located near to a boundary between the lower channel LCH and the upper channel UCH may be a dummy wordline. For example, the wordlines 5332 and 5333 adjacent to the boundary between the lower channel LCH and the upper channel UCH may be the dummy wordlines. In this case, data may not be stored in memory cells connected to the dummy wordline. Alternatively, the number of pages corresponding to the memory cells connected to the dummy wordline may be less than the number of pages corresponding to the memory cells connected to a general wordline. A level of a voltage applied to the dummy wordline may be different from a level of a voltage applied to the general wordline, and thus it is possible to reduce an influence of a non-uniform channel width between the lower and upper channels LCH and UCH on an operation of the memory device.

In some example embodiments, the number of the lower wordlines 5331 and 5332 penetrated by the lower channel LCH is less than the number of the upper wordlines 5333 to 5338 penetrated by the upper channel UCH in the region 'A2'. However, embodiments are not limited thereto. In some example embodiments, the number of the lower wordlines penetrated by the lower channel LCH may be equal to or more than the number of the upper wordlines penetrated by the upper channel UCH. In addition, structural features and connection relation of the channel structure CH disposed in the second cell region CREG2 may be substantially the same as those of the channel structure CH disposed in the first cell region CREG1.

In the bitline bonding region BLBA, a first through-electrode THV1 may be provided in the first cell region CREG1, and a second through-electrode THV2 may be provided in the second cell region CREG2. As illustrated in FIG. 22, the first through-electrode THV1 may penetrate the common source line 5320 and the plurality of wordlines 5330. In some example embodiments, the first through-electrode THV1 may further penetrate the second substrate 5310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some example embodiments, the first through-electrode THV1 and the second through-electrode THV2 may be electrically connected to each other through a first through-metal pattern 5372d and a second through-metal pattern 5472d. The first through-metal pattern 5372d may be formed at a bottom end of the first upper chip including the first cell region CREG1, and the second through-metal pattern 5472d may be formed at a top end of the second upper chip including the second cell region CREG2. The first through-electrode THV1 may be electrically connected to the first metal line 5350c and the second metal line 5360c. A lower via 5371d may be formed between the first through-electrode THV1 and the first through-metal pattern 5372d, and an upper via 5471d may be formed between the second through-electrode THV2 and the second through-metal pattern 5472d. The first through-metal pattern 5372d and the second through-metal pattern 5472d may be connected to each other by the bonding method.

In addition, in the bitline bonding region BLBA, an upper metal pattern 5252 may be formed in an uppermost metal layer of the peripheral circuit region PERI, and an upper metal pattern 5392 having the same shape as the upper metal pattern 5252 may be formed in an uppermost metal layer of the first cell region CREG1. The upper metal pattern 5392 of the first cell region CREG1 and the upper metal pattern 5252 of the peripheral circuit region PREG may be electrically connected to each other by the bonding method. In the bitline bonding region BLBA, the bitline 5360c may be electrically connected to a page buffer included in the peripheral circuit region PERI. For example, some of the circuit elements 5220c of the peripheral circuit region PREG may constitute the page buffer, and the bitline 5360c may be electrically connected to the circuit elements 5220c constituting the page buffer through an upper bonding metal pattern 5370c of the first cell region CREG1 and an upper bonding metal pattern 5270c of the peripheral circuit region PERI.

Referring continuously to FIG. 22, in the wordline bonding region WLBA, the wordlines 5330 of the first cell region CREG1 may extend in a second direction (e.g., an X-axis direction) parallel to the top surface of the second substrate 5310 and may be connected to a plurality of cell contact plugs 5340 (5341 to 5347). First metal lines 5350b and second metal lines 5360b may be sequentially connected onto the cell contact plugs 5340 connected to the wordlines 5330. In the wordline bonding region WLBA, the cell contact plugs 5340 may be connected to the peripheral circuit region PREG through upper bonding metal patterns 5370b of the first cell region CREG1 and upper bonding metal patterns 5270b of the peripheral circuit region PERI.

The cell contact plugs 5340 may be electrically connected to a row decoder included in the peripheral circuit region PERI. For example, some of the circuit elements 5220b of the peripheral circuit region PREG may constitute the row decoder, and the cell contact plugs 5340 may be electrically connected to the circuit elements 5220b constituting the row decoder through the upper bonding metal patterns 5370b of the first cell region CREG1 and the upper bonding metal patterns 5270b of the peripheral circuit region PERI. In some example embodiments, an operating voltage of the circuit elements 5220b constituting the row decoder may be different from an operating voltage of the circuit elements 5220c constituting the page buffer. For example, the operating voltage of the circuit elements 5220c constituting the page buffer may be greater than the operating voltage of the circuit elements 5220b constituting the row decoder.

Likewise, in the wordline bonding region WLBA, the wordlines 5430 of the second cell region CREG2 may extend in the second direction (e.g., the X-axis direction) parallel to the top surface of the third substrate 5410 and may be connected to a plurality of cell contact plugs 5440 (5441 to 5447). The cell contact plugs 5440 may be connected to the peripheral circuit region PREG through an upper metal pattern of the second cell region CREG2 and lower and upper metal patterns and a cell contact plug 5348 of the first cell region CREG1.

In the wordline bonding region WLBA, the upper bonding metal patterns 5370b may be formed in the first cell region CREG1, and the upper bonding metal patterns 5270b may be formed in the peripheral circuit region PERI. The upper bonding metal patterns 5370b of the first cell region CREG1 and the upper bonding metal patterns 5270b of the peripheral circuit region PREG may be electrically connected to each other by the bonding method. The upper bonding metal patterns 5370b and the upper bonding metal patterns 5270b may be formed of aluminum, copper, or tungsten.

In the external pad bonding region PA, a lower metal pattern 5371e may be formed in a lower portion of the first cell region CREG1, and an upper metal pattern 5472a may be formed in an upper portion of the second cell region CREG2. The lower metal pattern 5371e of the first cell region CREG1 and the upper metal pattern 5472a of the second cell region CREG2 may be connected to each other by the bonding method in the external pad bonding region PA. Likewise, an upper metal pattern 5372a may be formed in an upper portion of the first cell region CREG1, and an upper metal pattern 5272a may be formed in an upper portion of the peripheral circuit region PERI. The upper metal pattern 5372a of the first cell region CREG1 and the upper metal pattern 5272a of the peripheral circuit region PREG may be connected to each other by the bonding method.

Common source line contact plugs 5380 and 5480 may be disposed in the external pad bonding region PA. The common source line contact plugs 5380 and 5480 may be formed of a conductive material such as a metal, a metal compound, and/or doped polysilicon. The common source line contact plug 5380 of the first cell region CREG1 may be electrically connected to the common source line 5320, and the common source line contact plug 5480 of the second cell region CREG2 may be electrically connected to the common source line 5420. A first metal line 5350a and a second metal line 5360a may be sequentially stacked on the common source line contact plug 5380 of the first cell region CREG1, and a first metal line 5450a and a second metal line 5460a may be sequentially stacked on the common source line contact plug 5480 of the second cell region CREG2.

Input/output pads 5205, 5405 and 5406 may be disposed in the external pad bonding region PA. Referring to FIG. 22, a lower insulating layer 5201 may cover a bottom surface of the first substrate 5210, and a first input/output pad 5205 may be formed on the lower insulating layer 5201. The first input/output pad 5205 may be connected to at least one of a plurality of the circuit elements 5220a disposed in the peripheral circuit region PREG through a first input/output contact plug 5203 and may be separated from the first substrate 5210 by the lower insulating layer 5201. In addition, a side insulating layer may be disposed between the first input/output contact plug 5203 and the first substrate 5210 to electrically isolate the first input/output contact plug 5203 from the first substrate 5210.

An upper insulating layer 5401 covering a top surface of the third substrate 5410 may be formed on the third substrate 5410. A second input/output pad 5405 and/or a third input/output pad 5406 may be disposed on the upper insulating layer 5401. The second input/output pad 5405 may be connected to at least one of the plurality of circuit elements 5220a disposed in the peripheral circuit region PREG through second input/output contact plugs 5403 and 5303, and the third input/output pad 5406 may be connected to at least one of the plurality of circuit elements 5220a disposed in the peripheral circuit region PREG through third input/output contact plugs 5404 and 5304.

In some example embodiments, the third substrate 5410 may not be disposed in a region in which the input/output contact plug is disposed. For example, as illustrated in a region 13', the third input/output contact plug 5404 may be separated from the third substrate 5410 in a direction parallel to the top surface of the third substrate 5410 and may penetrate an interlayer insulating layer 5415 of the second cell region CREG2 so as to be connected to the third input/output pad 5406. In this case, the third input/output contact plug 5404 may be formed by at least one of various processes.

In some example embodiments, as illustrated in a region 131', the third input/output contact plug 5404 may extend in a third direction (e.g., the Z-axis direction), and a diameter of the third input/output contact plug 5404 may become progressively greater toward the upper insulating layer 5401. In other words, a diameter of the channel structure CH described in the region 'A1' may become progressively less toward the upper insulating layer 5401, but the diameter of the third input/output contact plug 5404 may become progressively greater toward the upper insulating layer 5401. For example, the third input/output contact plug 5404 may be formed after the second cell region CREG2 and the first cell region CREG1 are bonded to each other by the bonding method.

In some example embodiments, as illustrated in a region 132', the third input/output contact plug 5404 may extend in the third direction (e.g., the Z-axis direction), and a diameter of the third input/output contact plug 5404 may become progressively less toward the upper insulating layer 5401. In other words, like the channel structure CH, the diameter of the third input/output contact plug 5404 may become progressively less toward the upper insulating layer 5401. For example, the third input/output contact plug 5404 may be formed together with the cell contact plugs 5440 before the second cell region CREG2 and the first cell region CREG1 are bonded to each other.

In some example embodiments, the input/output contact plug may overlap with the third substrate 5410. For example, as illustrated in a region 'C', the second input/output contact plug 5403 may penetrate the interlayer insulating layer 5415 of the second cell region CREG2 in the third direction (e.g., the Z-axis direction) and may be electrically connected to the second input/output pad 5405 through the third substrate 5410. In this case, a connection structure of the second input/output contact plug 5403 and the second input/output pad 5405 may be realized by various methods.

In some example embodiments, as illustrated in a region 'C1', an opening 5408 may be formed to penetrate the third substrate 5410, and the second input/output contact plug 5403 may be connected directly to the second input/output pad 5405 through the opening 5408 formed in the third substrate 5410. In this case, as illustrated in the region 'C1', a diameter of the second input/output contact plug 5403 may become progressively greater toward the second input/output pad 5405. However, embodiments are not limited thereto, and in some example embodiments, the diameter of the second input/output contact plug 5403 may become progressively less toward the second input/output pad 5405.

In some example embodiments, as illustrated in a region 'C2', the opening 5408 penetrating the third substrate 5410 may be formed, and a contact 5407 may be formed in the opening 5408. An end of the contact 5407 may be connected to the second input/output pad 5405, and another end of the contact 5407 may be connected to the second input/output contact plug 5403. Thus, the second input/output contact plug 5403 may be electrically connected to the second input/output pad 5405 through the contact 5407 in the opening 5408. In this case, as illustrated in the region 'C2', a diameter of the contact 5407 may become progressively greater toward the second input/output pad 5405, and a diameter of the second input/output contact plug 5403 may become progressively less toward the second input/output pad 5405. For example, the second input/output contact plug 5403 may be formed together with the cell contact plugs 5440 before the second cell region CREG2 and the first cell region CREG1 are bonded to each other, and the contact 5407 may be formed after the second cell region CREG2 and the first cell region CREG1 are bonded to each other.

In some example embodiments illustrated in a region 'C3', a stopper 5409 may further be formed on a bottom end of the opening 5408 of the third substrate 5410, as compared with the embodiments of the region 'C2'. The stopper 5409 may be a metal line formed in the same layer as the common source line 5420. Alternatively, the stopper 5409 may be a metal line formed in the same layer as at least one of the wordlines 5430. The second input/output contact plug 5403 may be electrically connected to the second input/output pad 5405 through the contact 5407 and the stopper 5409.

Like the second and third input/output contact plugs 5403 and 5404 of the second cell region CREG2, a diameter of each of the second and third input/output contact plugs 5303 and 5304 of the first cell region CREG1 may become progressively less toward the lower metal pattern 5371e or may become progressively greater toward the lower metal pattern 5371e.

In some example embodiments, a slit 5411 may be formed in the third substrate 5410. For example, the slit 5411 may be formed at a certain position of the external pad bonding region PA. For example, as illustrated in a region 'D', the slit 5411 may be located between the second input/output pad 5405 and the cell contact plugs 5440 when viewed in a plan view. Alternatively, the second input/output pad 5405 may be located between the slit 5411 and the cell contact plugs 5440 when viewed in a plan view.

In some example embodiments, as illustrated in a region 'D1', the slit 5411 may be formed to penetrate the third substrate 5410. For example, the slit 5411 may be used to prevent the third substrate 5410 from being finely cracked when the opening 5408 is formed. However, embodiments are not limited thereto, and in some example embodiments, the slit 5411 may be formed to have a depth ranging from about 60% to about 70% of a thickness of the third substrate 5410.

In some example embodiments, as illustrated in a region 'D2', a conductive material 5412 may be formed in the slit 5411. For example, the conductive material 5412 may be used to discharge a leakage current occurring in driving of the circuit elements in the external pad bonding region PA to the outside. In this case, the conductive material 5412 may be connected to an external ground line.

In some example embodiments, as illustrated in a region 'D3', an insulating material 5413 may be formed in the slit 5411. For example, the insulating material 5413 may be used to electrically isolate the second input/output pad 5405 and the second input/output contact plug 5403 disposed in the external pad bonding region PA from the wordline bonding region WLBA. Since the insulating material 5413 is formed in the slit 5411, it is possible to prevent a voltage provided through the second input/output pad 5405 from affecting a metal layer disposed on the third substrate 5410 in the wordline bonding region WLBA.

In some example embodiments, the first to third input/output pads 5205, 5405 and 5406 may be selectively formed. For example, the memory device 5000 may be realized to include only the first input/output pad 5205 disposed on the first substrate 5210, to include only the second input/output pad 5405 disposed on the third substrate 5410, or to include only the third input/output pad 5406 disposed on the upper insulating layer 5401.

In some example embodiments, at least one of the second substrate 5310 of the first cell region CREG1 or the third substrate 5410 of the second cell region CREG2 may be used as a sacrificial substrate and may be completely or partially removed before or after a bonding process. An additional layer may be stacked after the removal of the substrate. For example, the second substrate 5310 of the first cell region CREG1 may be removed before or after the bonding process of the peripheral circuit region PREG and the first cell region CREG1, and then, an insulating layer covering a top surface of the common source line 5320 or a conductive layer for connection may be formed. Likewise, the third substrate 5410 of the second cell region CREG2 may be removed before or after the bonding process of the first cell region CREG1 and the second cell region CREG2, and then, the upper insulating layer 5401 covering a top surface of the common source line 5420 or a conductive layer for connection may be formed.

Figure 23:
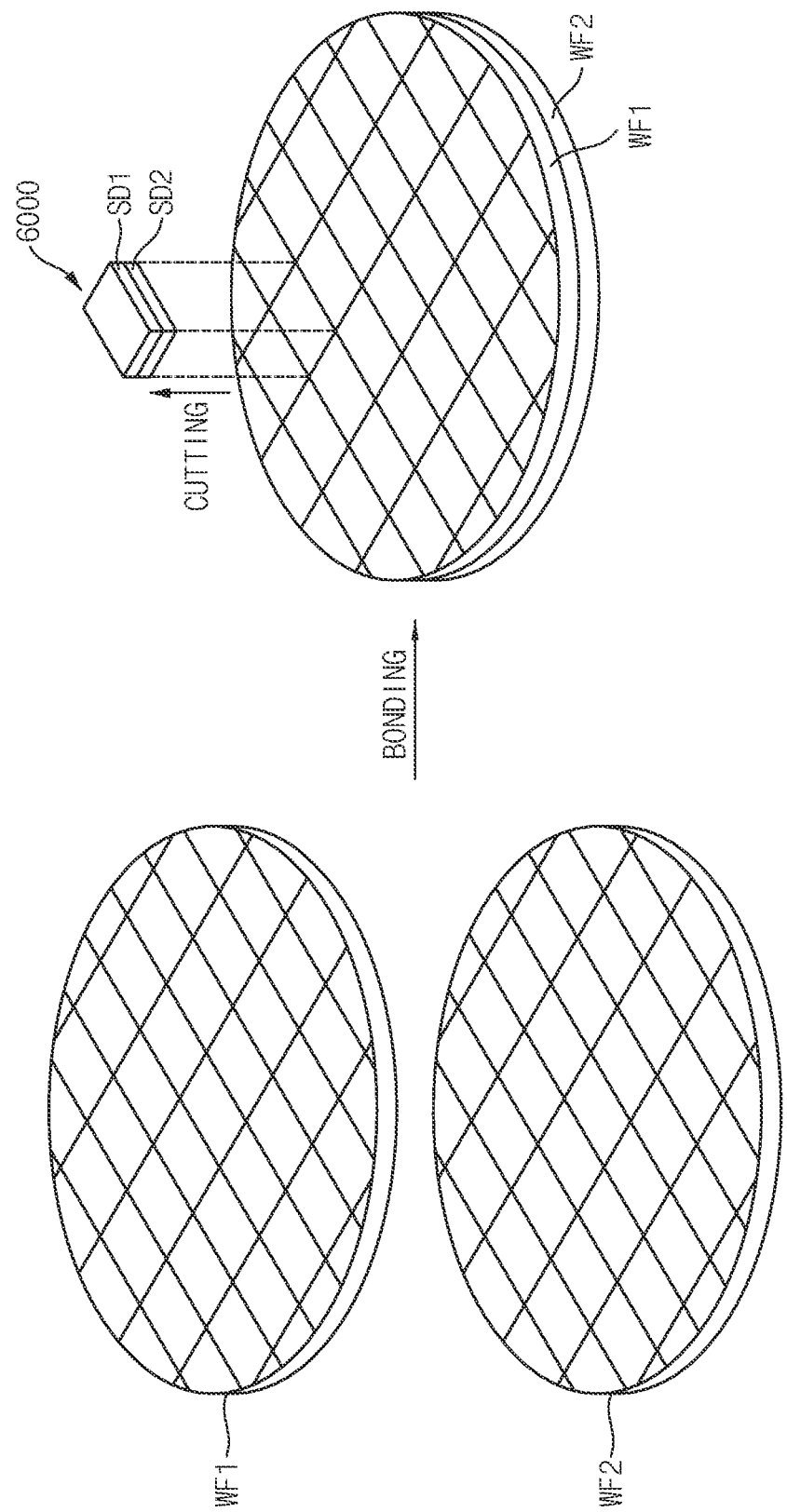
FIG. 23 is a diagram illustrating a manufacturing process of a stacked semiconductor device according to some example embodiments.

FIG. 23 is a diagram illustrating a manufacturing process of a stacked semiconductor device according to some example embodiments.

Referring to FIG. 23, respective integrated circuits may be formed on a first wafer WF1 and a second wafer WF2. The memory cell array may be formed in the first wafer WF1, and the peripheral circuits may be formed in the second wafer WF2.

After the various integrated circuits have been respectively formed on the first and second wafers WF1 and WF2, the first wafer WF1 and the second wafer WF2 may be bonded together. The bonded wafers WF1 and WF2 may then be cut (or divided) into separate chips, in which each chip corresponds to a semiconductor device such as, for example, the memory device 6000, including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1, and each cut portion of the second wafer WF2 corresponds to the second semiconductor die SD2. For example, the memory device 5000 of FIG. 22 may be manufactured based on the manufacturing process of FIG. 23.

The example embodiments discussed herein may be applied to various electronic devices and systems that include the nonvolatile memory devices and the memory packages. For example, the example embodiments discussed herein may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A nonvolatile memory device comprising:
a first semiconductor layer including:
a plurality of wordlines extending in a first direction;
a plurality of bitlines extending in a second direction crossing the first direction; and
a memory cell array connected to the plurality of wordlines and the plurality of bitlines, the memory cell array including at least one memory block; and
a second semiconductor layer beneath the first semiconductor layer in a third direction perpendicular to both the first direction and the second direction, the second semiconductor layer including:
a substrate; and
an address decoder on the substrate, the address decoder configured to control the memory cell array,
wherein the address decoder includes:
a plurality of pass transistors connected to the plurality of wordlines; and
a plurality of drivers configured to control switching operations of the plurality of pass transistors,
wherein, in the second semiconductor layer, the plurality of drivers are arranged in a first layout pattern along the first direction and the second direction, and the plurality of pass transistors are arranged in a second layout pattern along the first direction and the second direction,
wherein the second semiconductor layer includes a first region and a second region that is spaced apart from the first region in at least one of the first direction and the second direction, the first region and the second region comprising the plurality of pass transistors and the plurality of drivers,
wherein the first layout pattern is different from the second layout pattern,
wherein the first region includes only the pass transistors and the second region includes only the drivers,
wherein a first memory block of the at least one memory block includes a first cell region including a plurality of memory cells, and a first extension region adjacent to a first side of the first cell region,
wherein first pass transistors of the plurality of pass transistors that are connected to first wordlines of the plurality of wordlines that are connected to the first memory block are disposed in the first region of the second semiconductor layer that corresponds to the first extension region, and
wherein first drivers of the plurality of drivers that are configured to control the first pass transistors are disposed in the second region of the second semiconductor layer that corresponds to the first cell region.

2. The nonvolatile memory device of claim 1,
wherein the first wordlines extend in the first direction and are arranged along the second direction,
wherein the first pass transistors are arranged in the first region to correspond to an arrangement of the first wordlines, and
wherein the first drivers are arranged in the second region without regard to the arrangement of the first wordlines.

3. The nonvolatile memory device of claim 2,
wherein all of the first pass transistors are arranged along the second direction in the first region, and
wherein two or more of the first drivers are arranged along the first direction in the second region, and two or more of the first drivers are arranged along the second direction in the second region.

4. The nonvolatile memory device of claim 1, further comprising:
a first coding logic disposed in a third region of the second semiconductor layer that corresponds to the first cell region, the first coding logic configured to generate a first coding signal,
wherein the first drivers are configured to generate first switching control signals for controlling switching operations of the first pass transistors based on the first coding signal, and
wherein the first coding signal is directly provided from the first coding logic to the first drivers without passing through the first region.

5. The nonvolatile memory device of claim 1,
wherein the first pass transistors and the first drivers are electrically connected to each other by through-hole vias and upper conductive lines,
wherein the first extension region includes an insulating mold structure, and the through-hole vias penetrate the insulating mold structure, and
wherein the upper conductive lines are disposed above the plurality of memory cells.

6. The nonvolatile memory device of claim 5, wherein:
the first drivers are configured to generate first switching control signals for controlling switching operations of the first pass transistors, and
each of the first switching control signals is provided to a respective one of the first pass transistors by two or more of the through-hole vias.

7. The nonvolatile memory device of claim 5,
wherein the first extension region includes:
at least one step region having a step shape in a cross-sectional view; and
at least one flat zone having a flat shape in the cross-sectional view, and
wherein the through-hole vias penetrate the insulating mold structure in the at least one flat zone.

8. The nonvolatile memory device of claim 1,
wherein the first pass transistors and the first drivers are electrically connected to each other by lower conductive lines, and
wherein the lower conductive lines are disposed under the plurality of memory cells.

9. The nonvolatile memory device of claim 1,
wherein the first memory block further includes:
a second extension region adjacent to a second side of the first cell region opposite the first side of the first cell region,
wherein second pass transistors of the plurality of pass transistors that are connected to the first wordlines are disposed in a third region of the second semiconductor layer corresponding to the second extension region, and
wherein the first drivers are configured to further control the second pass transistors.

10. The nonvolatile memory device of claim 9,
wherein the first pass transistors and the second pass transistors and the first drivers are electrically connected to each other by through-hole vias and upper conductive lines,
wherein each of the first extension region and the second extension region includes an insulating mold structure and the through-hole vias penetrate the insulating mold structures included in the first extension region and the second extension region, and
wherein the upper conductive lines are disposed above the plurality of memory cells.

11. The nonvolatile memory device of claim 1,
wherein the at least one memory block comprises a plurality of memory blocks,
wherein a second memory block among the plurality of memory blocks includes:
a second cell region including a plurality of memory cells; and
a second extension region adjacent to a first side of the second cell region,
wherein second pass transistors of the plurality of pass transistors that are connected to second wordlines of the plurality of wordlines that are connected to the second memory block are disposed in a third region of the second semiconductor layer corresponding to the second extension region, and
wherein second drivers of the plurality of drivers that are configured to control the second pass transistors are disposed in a fourth region of the second semiconductor layer corresponding to the second cell region.

12. The nonvolatile memory device of claim 11,
wherein the second memory block further includes:
a third extension region adjacent to a second side of the second cell region opposite the first side of the second cell region,
wherein third pass transistors of the plurality of pass transistors that are connected to the second wordlines are disposed in a fifth region of the second semiconductor layer corresponding to the third extension region, and
wherein the second drivers are configured to further control the third pass transistors.

13. The nonvolatile memory device of claim 1,
wherein the second semiconductor layer further includes:
a page buffer circuit on the substrate, the page buffer circuit including a plurality of page buffers and being configured to control the memory cell array, and
wherein a portion of the plurality of page buffers are disposed in a third region of the second semiconductor layer corresponding to the first cell region.

14. The nonvolatile memory device of claim 1,
wherein the first semiconductor layer further includes a plurality of first metal pads,
wherein the second semiconductor layer further includes a plurality of second metal pads, and
wherein the first semiconductor layer and the second semiconductor layer are electrically connected in the third direction by the plurality of first metal pads and the plurality of second metal pads.

15. The nonvolatile memory device of claim 14, wherein each of the plurality of first metal pads and the plurality of second metal pads is formed of copper (Cu).

16. The nonvolatile memory device of claim 14, wherein the plurality of first metal pads and the plurality of second metal pads are connected by a bonding method.

17. The nonvolatile memory device of claim 14,
wherein the first semiconductor layer is formed in a first semiconductor wafer, and
wherein the second semiconductor layer is formed in a second semiconductor wafer.

18. A memory package comprising:
a base substrate; and
a plurality of memory chips stacked on the base substrate,
wherein each of the plurality of memory chips includes:
a first semiconductor layer including:
a plurality of wordlines extending in a first direction;
a plurality of bitlines extending in a second direction crossing the first direction; and
a memory cell array connected to the plurality of wordlines and the plurality of bitlines, the memory cell array including at least one memory block; and
wherein each of the plurality of memory chips further includes:
a second semiconductor layer beneath the first semiconductor layer in a third direction perpendicular to both the first direction and the second direction, the second semiconductor layer including:
a substrate; and
an address decoder on the substrate, the address decoder configured to control the memory cell array,
wherein the address decoder includes:
a plurality of pass transistors connected to the plurality of wordlines; and
a plurality of drivers configured to control switching operations of the plurality of pass transistors,
wherein, in the second semiconductor layer, the plurality of drivers are arranged by a first layout pattern along the first direction and the second direction, and the plurality of pass transistors are arranged by a second layout pattern along the first direction and the second direction,
wherein the second semiconductor layer includes a first region and a second region that is spaced apart from the first region in at least one of the first direction and the second direction, the first region and the second region comprising the plurality of pass transistors and the plurality of drivers,
wherein the first layout pattern is different from the second layout pattern, and
wherein the first region includes only the pass transistors and the second region includes only the drivers,
wherein a first memory block of the at least one memory block includes a first cell region including a plurality of memory cells, and a first extension region adjacent to a first side of the first cell region,
wherein first pass transistors of the plurality of pass transistors that are connected to first wordlines of the plurality of wordlines that are connected to the first memory block are disposed in the first region of the second semiconductor layer that corresponds to the first extension region, and wherein first drivers of the plurality of drivers that are configured to control the first pass transistors are disposed in the second region of the second semiconductor layer that corresponds to the first cell region.

19. A nonvolatile memory device comprising:

a first semiconductor layer including:
- a plurality of wordlines extending in a first direction;
- a plurality of bitlines extending in a second direction crossing the first direction; and
- a memory cell array including a memory block connected to the plurality of wordlines and the plurality of bitlines; and a second semiconductor layer beneath the first semiconductor layer in a third direction perpendicular to both the first direction and the second direction, the second semiconductor layer including:
- a substrate; and
- an address decoder on the substrate, the address decoder configured to control the memory cell array, wherein the address decoder includes:
- a plurality of pass transistors connected to the plurality of wordlines; and
- a plurality of drivers configured to control switching operations of the plurality of pass transistors, wherein the memory block includes:
- a cell region including a plurality of memory cells;
- a first extension region adjacent to a first side of the cell region; and
- a second extension region adjacent to a second side of the cell region opposite the first side of the cell region, wherein the plurality of pass transistors are disposed in a first region and a second region of the second semiconductor layer that respectively correspond to the first extension region and the second extension region, and all of the plurality of pass transistors are arranged along the second direction in the first region and the second region to correspond to an arrangement of the plurality of wordlines, wherein the plurality of drivers are disposed in a third region of the second semiconductor layer that corresponds to the cell region and are arranged in the third region without regard to the arrangement of the plurality of wordlines, two or more of the plurality of drivers are arranged along the first direction in the third region, and two or more of the plurality of drivers are arranged along the second direction in the third region, wherein each of the first region and the second region includes only the pass transistors and the third region includes only the drivers, and wherein the plurality of pass transistors and the plurality of drivers are electrically connected to each other by through-hole vias and upper conductive lines, or by lower conductive lines, the through-hole vias penetrate an insulating mold structure included in one of the first extension region and the second extension region, the upper conductive lines are disposed above the plurality of memory cells, and the lower conductive lines are disposed under the plurality of memory cells.

* * * * *